United States Patent
Bisaiji et al.

(10) Patent No.: US 9,427,704 B2
(45) Date of Patent: *Aug. 30, 2016

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi (JP)

(72) Inventors: Yuki Bisaiji, Susono (JP); Kohei Yoshida, Gotemba (JP); Mikio Inoue, Susono (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/429,508

(22) PCT Filed: Sep. 25, 2012

(86) PCT No.: PCT/JP2012/074579
§ 371 (c)(1),
(2) Date: Mar. 19, 2015

(87) PCT Pub. No.: WO2014/049690
PCT Pub. Date: Apr. 3, 2014

(65) Prior Publication Data
US 2015/0231570 A1    Aug. 20, 2015

(51) Int. Cl.
*B01D 53/94* (2006.01)
(52) U.S. Cl.
CPC ....... *B01D 53/9495* (2013.01); *B01D 53/9431* (2013.01)
(58) Field of Classification Search
None
See application file for complete search history.

(56) References Cited

U.S. PATENT DOCUMENTS 7,469,691 B2 * 12/2008 Joergl .............. F02D 41/0065
123/568.12
2010/0018187 A1    1/2010 Matsumoto et al.
2010/0211293 A1    8/2010 Yamada et al.
(Continued)

FOREIGN PATENT DOCUMENTS

EP    2 642 096 A1    9/2013
JP    2007-92683      4/2007
(Continued)

OTHER PUBLICATIONS

Tomohiro et al.—JP2008208720—machine translation 2008.*
(Continued)

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

In an internal combustion engine, an exhaust purification catalyst: (13), particulate filter (14), and hydrocarbon feed valve (15) are arranged in an engine exhaust passage. A low pressure exhaust gas recirculation system (LPL) is provided for making the exhaust gas downstream of the particulate filter (14) recirculate. If hydrocarbons are injected from the hydrocarbon feed valve (15), the carbon dioxide which is produced in the exhaust purification catalyst (13) is recirculated and the air-fuel ratio of the exhaust gas which flows into the exhaust purification catalyst (13) temporarily drops. At the time of regeneration of the particulate filter (14), hydrocarbons are injected from, the hydrocarbon feed valve (15) so as not to overlap with this temporary drop of the air-fuel ratio.

9 Claims, 23 Drawing Sheets

(56) References Cited

U.S. PATENT DOCUMENTS

| | | |
|---|---|---|
| 2012/0131908 A1 | 5/2012 | Bisaiji et al. |
| 2012/0144806 A1 | 6/2012 | Hamamatsu et al. |

FOREIGN PATENT DOCUMENTS

| | | |
|---|---|---|
| JP | 2008208720 A * | 9/2008 |
| JP | 2008-280952 | 11/2008 |
| JP | 2009-257195 | 11/2009 |
| JP | 2010-222972 | 10/2010 |
| WO | WO 2008/122866 A2 | 10/2008 |
| WO | WO 2011/114499 A1 | 9/2011 |

OTHER PUBLICATIONS

Choi et al. Functionality of Commercial NOx Storage-Reduction Catalysts and the Development of a Representative Model. Oak Ridge National Laboratory. US Department of Energy. 2010, ppt. pp. 1-27 http://energy.gov/sites/prod/files/2014/03/f8/deer10_toops1.pdf.*

Toru Uenishi et al., "Exhaust Purification System of Internal Combustion Engine", U.S. Appl. No. 14/116,542, having a § 371(c) date of Nov. 8, 2013.

Notice of Allowance issued in U.S. Appl. No. 14/116,542 on May 25, 2016.

* cited by examiner

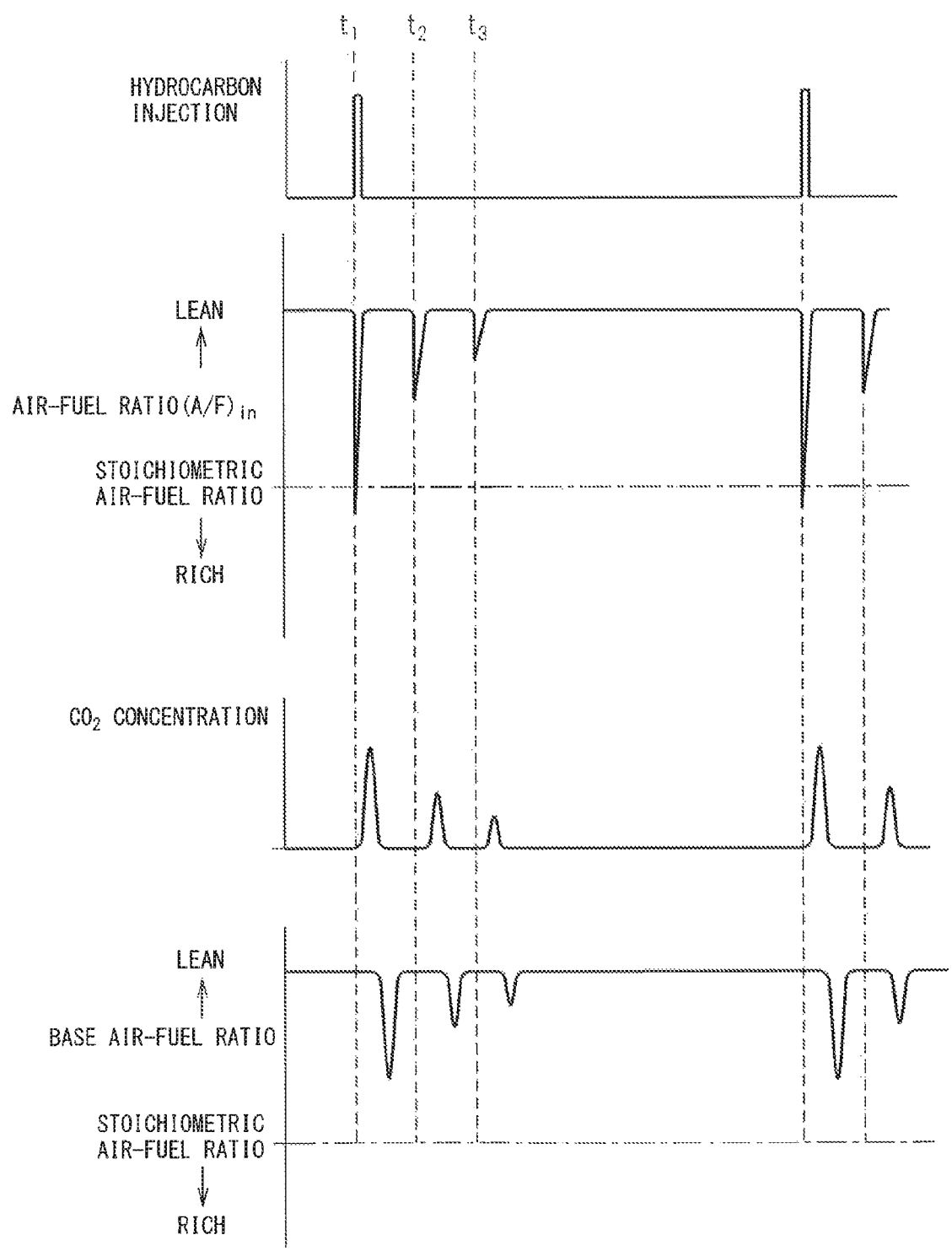

FIG. 20A $Q$ | $GR_{11}$  $GR_{21}$ ----- $GR_{m1}$
    | $GR_{12}$
    |    ⋮
    | $GR_{1n}$ ------------- $GR_{mn}$
    |_____ $N$

FIG. 20B $Q$ | $WTX_{11}$  $WTX_{21}$ ------ $WTX_{m1}$
    | $WTX_{12}$
    |    ⋮
    | $WTX_{1n}$ -------------- $WTX_{mn}$
    |_____ $N$

EXHAUST PURIFICATION SYSTEM OF INTERNAL COMBUSTION ENGINE

CROSS-REFERENCE TO RELATED APPLICATIONS

This application is a national phase application of International Application No. PCT/JP2012/074579, filed Sep. 25, 2012, the content of which is incorporated herein by reference.

TECHNICAL FIELD

The present invention relates to an exhaust purification system of an internal combustion engine.

BACKGROUND ART

Known in the art is an internal, combustion engine which is provided with an exhaust gas recirculation system for causing exhaust gas exhausted into an engine exhaust passage to be recirculated inside of an intake passage, in which an exhaust purification catalyst is arranged in an engine exhaust passage and a hydrocarbon feed valve is arranged upstream of the exhaust purification catalyst in the engine exhaust passage, a precious metal catalyst is carried on an exhaust gas flow surface of the exhaust purification catalyst and a basic exhaust gas flow surface part is formed around the precious metal catalyst, and hydrocarbons are injected from the hydrocarbon feed valve by a predetermined period at the time of engine operation to thereby remove the $NO_x$ which is contained in the exhaust gas (for example, see PTL 1). In this internal combustion engine, even if the temperature of the exhaust purification catalyst becomes high, a high $NO_x$ purification rate can be obtained.

CITATIONS LIST

Patent Literature

PTL 1: WO2011/114499A1

SUMMARY OF INVENTION

Technical Problem

However, it is desired to obtain a further higher $NO_x$ purification rate than in this internal combustion engine.

An object of the present invention is to provide an exhaust purification system of an internal combustion engine capable of suppressing the odd feeling which is given to passengers due to torque fluctuation while raising the $NO_x$ purification rate.

Solution to Problem

According to the present invention, there is provided an exhaust purification system of an internal combustion engine in which a hydrocarbon feed valve is arranged in an engine exhaust passage, an exhaust purification catalyst and a particulate filter are arranged downstream of the hydrocarbon feed valve in the engine exhaust passage, a precious metal catalyst is carried on an exhaust gas flow surface of the exhaust purification catalyst, a basic exhaust gas flow surface part is formed around the precious metal catalyst, the exhaust purification catalyst has a property of reducing $NO_X$ contained in an exhaust gas when making a concentration of hydrocarbons which flow into the exhaust purification catalyst vibrate within, a predetermined range of amplitude and within a predetermined range of period and has a property of being increased in storage amount of $NO_X$ contained in the exhaust gas if making the vibration period of the hydrocarbon concentration longer than the predetermined range, and hydrocarbons are injected from the hydrocarbon feed valve within the predetermined period at the time of engine operation to thereby remove $NO_X$ contained in the exhaust gas, wherein the exhaust purification system comprises a low pressure exhaust gas recirculation system which makes an exhaust gas in the engine exhaust passage downstream of the exhaust purification catalyst and particulate filter recirculate to an inside of an intake passage, wherein if hydrocarbons are injected from the hydrocarbon feed valve when an exhaust gas recirculation action by the low pressure exhaust gas recirculation system is performed, a carbon dioxide produced in the exhaust purification catalyst is recirculated and after the injection of hydrocarbons, each time the time which is required for recirculation of the carbon dioxide elapses, a temporary drop in an air-fuel ratio of an inflowing exhaust, gas which flows into the exhaust purification catalyst and particulate filter is repeatedly caused, an injection of hydrocarbons from the hydrocarbon feed valve which is synchronized with the temporary drop in air-fuel ratio of the inflowing exhaust:gas is allowed when hydrocarbons are injected from the hydrocarbon feed valve within the predetermined period for removing $NO_x$ which is contained in the exhaust gas, and hydrocarbons are injected from the hydrocarbon feed valve so as not to overlap with the temporary drop in the air-fuel ratio of the inflowing exhaust gas when hydrocarbons are periodically injected from the hydrocarbon feed valve for temperature elevation control of at least one of the particulate filter and exhaust purification catalyst.

Advantageous Effects of Invention

A high $NO_x$ purification rate can be obtained and the odd feeling which is given to passengers due to torque fluctuation can be suppressed.

BRIEF DESCRIPTION OF DRAWINGS

FIG. 17 is a view which shows changes in the air-fuel ratio of the exhaust gas which flows into an exhaust purification catalyst, etc.

FIGS. 20A and 20B are views which show the EGR rate and the injection time of hydrocarbons, respectively.

FIGS. 28A and 23B are views which show regions in which an amount of slipthrough of HC is large.

DESCRIPTION OF EMBODIMENTS

Figure 1:
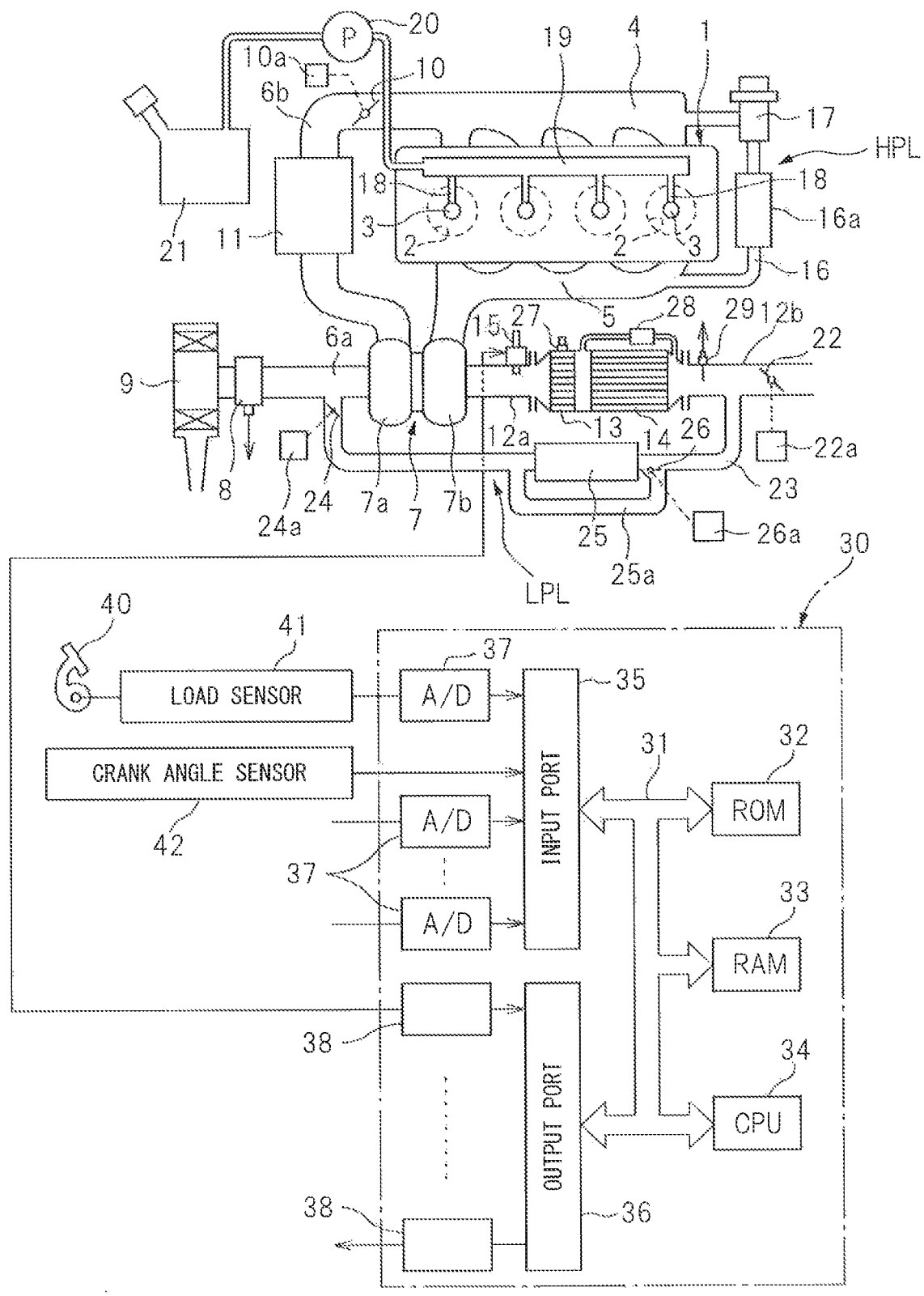
FIG. 1 is an overall view of a compression ignition type internal combustion engine.

FIG. 1 is an overall view of a compression ignition type internal combustion engine. Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6b to an outlet of a compressor 7a of an exhaust turbocharger 7, while an inlet of the compressor 7a is connected through an intake coot 6a and an intake air amount detector 8 to an air cleaner 9. Inside the intake duct 6a, a throttle valve 10 which is driven, by an actuator 10a is arranged. Around the intake duct 6b, a cooling device 11 is arranged for cooling the intake air which flows through the inside of the intake duct 6b. In the embodiment which is shown in FIG. 1, the engine cooling water is guided to the inside of the cooling device 11 where the engine cooling water is used to cool the intake air.

On the other hand, the exhaust manifold 5 is connected to the inlet of an exhaust turbine 7b of the exhaust turbocharger 7, and the outlet of the exhaust turbine 7b is connected through an exhaust pipe 12a to the inlet of the exhaust purification catalyst 13. A particulate filter 14 is arranged downstream of the exhaust purification catalyst 13, and the outlet of the particulate filter 14 is connected to an exhaust pipe 12b. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation, (hereinafter referred to as an "EGR") passage 16. An electronically controlled EGR control valve 17 is arranged in the EGR passage 16, and around the EGR passage 16, a cooling device 16a is arranged for cooling the exhaust gas which flows through the inside of the EGR passage 16, in the embodiment which is shown in FIG. 1, the engine cooling water is guided to the inside of the cooling device 16a where the engine cooling water is used to cool the exhaust gas. Further, each fuel injector 3 is connected through a fuel feed tube 18 to a common rail 19. This common rail 19 is connected through an electronically controlled variable discharge fuel pump 20 to a fuel tank 21. The fuel which is stored inside of the fuel tank 21 is fed by the fuel pump 20 to the inside of the common rail 19. The fuel which is fed to the inside of the common rail 19 is fed through each fuel feed tube 18 to the fuel injector 3.

On the other hand, downstream of the particulate filter 14 inside of the exhaust pipe 12b, an exhaust control valve 22 which is driven toy an actuator 22a is arranged. The inside of the exhaust pipe 12b between this exhaust control valve 22 and the particulate filter 14 is connected through an EGR passage 23 to the intake pipe 6a. Inside this EGR passage 23, an EGR control valve 24 which is driven by an actuator 24a is arranged. Further, around the EGR passage 23, a cooling device 25 is arranged for cooling the exhaust gas which flows through the inside of the EGR passage 23. In the embodiment which is shown in FIG. 1, the engine cooling water is guided to the inside of the cooling device 25 where the engine cooling water is used to cool the exhaust gas. In addition, a bypass passage 25a which bypasses the cooling device 25 is connected to the EGR passage 23, and a flow pass switching valve 26 for selectively feeding an EGR gas to the inside of the cooling device 25 or the inside of the bypass passage 25a is arranged at the branching off portion of the inlet of the EGR gas to the inside of the cooling device 25 and the inlet of the EGR gas to the inside of the bypass passage 25a. The switching control of the flow pass switching valve 26 is performed by an actuator 26a, and the flow pass switching valve 26 is normally held at a position in which the flow pass switching valve 26 closes the inlet of the bypass passage 25a as shown in FIG. 1 so that the EGR gas flows into the cooling device 25.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 27 is arranged for detecting the temperature of the exhaust purification catalyst 13, and a pressure difference sensor 28 for detecting the pressure difference between before and after the particulate filter 14 is attached to the particulate filter 14. In addition, downstream of the particulate filter 14, a temperature sensor 29 is arranged for detecting the temperature of the particulate filter 14. The output signals of these temperature sensor 27, 29, pressure difference sensor 28 and intake air amount detector 8 are input through respectively corresponding AD converters 37 to the input port 35. Further, the accelerator pedal 40 has a load, sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, actuator 10a for driving the throttle valve, hydrocarbon feed valve 15, EGR control valve 17, fuel pump 20, actuator 22a for driving the exhaust control valve, actuator 24a for driving the EGR control valve and actuator 26a for driving the flow pass switching valve.

As explained above, in the embodiment which is shown in FIG. 1, an exhaust gas recirculation system HPL which is comprised of the EGR passage 16 and EGR control valve 17 and an exhaust gas recirculation system LPL which is comprised of the EGR passage 23 and EGR control valve 24, that is, two exhaust gas recirculation systems, are provided. In this case, as will be understood from FIG. 1, in the exhaust gas recirculation system HPL, the exhaust gas in the exhaust manifold 5 is recirculated, while in the exhaust gas recirculation system LPL, the exhaust gas in the exhaust pipe 12a downstream of the exhaust purification catalyst 13 and the particulate filter 14 is recirculated. In this regard, in this case, the pressure of the exhaust gas in the exhaust manifold 5 is considerably higher than the pressure of the exhaust gas in the exhaust pipe 12a downstream of the exhaust purification catalyst 13 and the particulate filter 14. Therefore, the exhaust gas recirculation system HPL will hereinafter be called the "high pressure exhaust gas recirculation system" for recirculating the relatively high pressure exhaust gas in the engine exhaust passage upstream of the exhaust turbine 7b to the inside of the intake passage downstream of the compressor 7a, while the exhaust gas recirculation system LPL will hereinafter be called the "low pressure exhaust gas recirculation system" for recirculating the relatively low pressure exhaust gas in the engine exhaust passage downstream of the exhaust purification catalyst 13 and the particulate filter 14 to the inside of the intake passage upstream of the compressor 7a.

Figure 2:
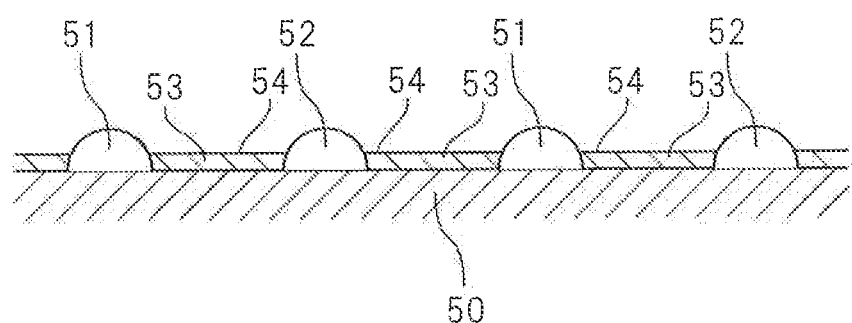
FIG. 2 is a view which schematically shows the surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the "basic exhaust gas flow surface parts 54".

On the other hand, in FIG. 2, the precious metal catalyst 51 is comprised of platinum Pt, while the precious metal catalyst 52 is comprised of rhodium Rh. Note that, in this case, both, the precious metal catalysts 51 and 52 may be comprised from platinum Pt. Further, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of at least one of platinum Pt, rhodium Rh and palladium Pd.

Figure 3:
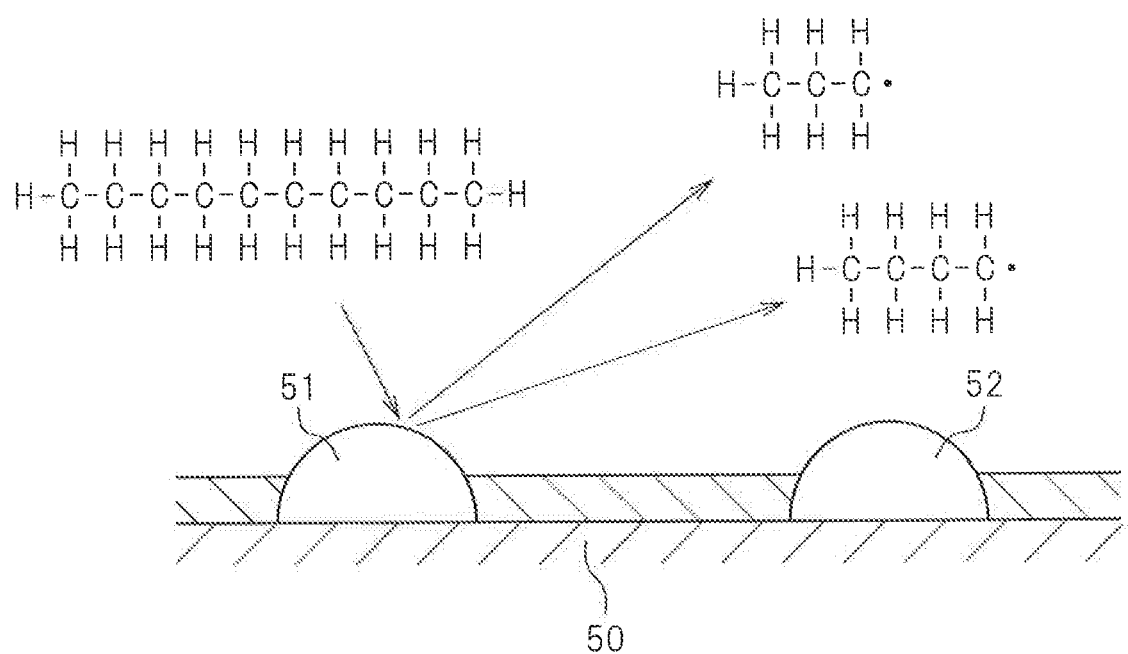
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed, at the exhaust purification catalyst 13 at this time. As shown in FIG. 3, the hydrocarbons HC which are injected from the hydrocarbon feed valve 15 become radical hydrocarbons HC with a small carbon number due to the catalyst 51.

Figure 4:
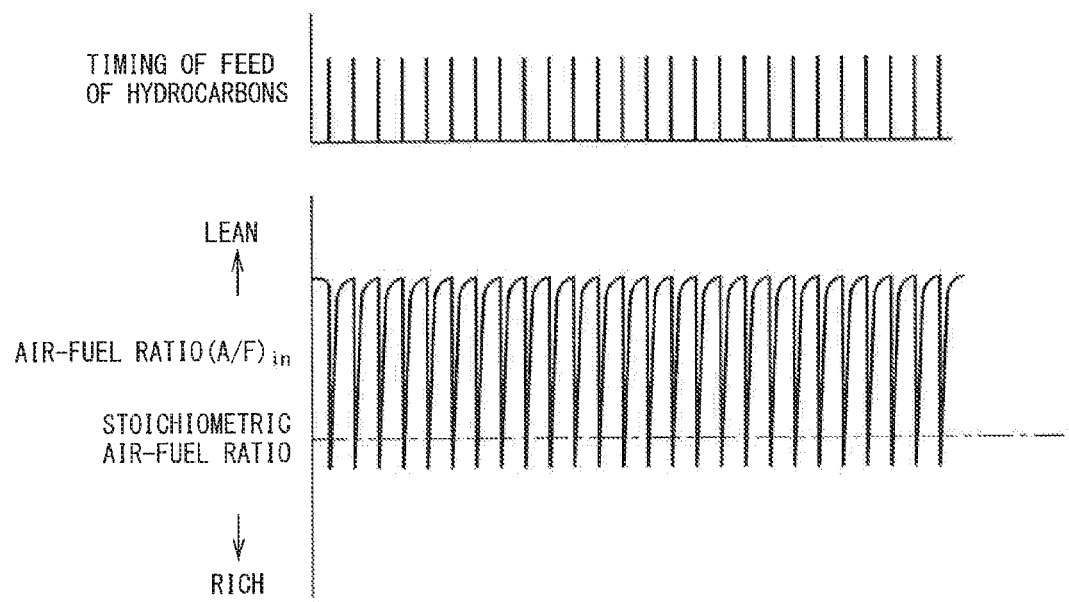
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F)in of the exhaust gas which flows into the exhaust purification catalyst 13. Note that, the changes in the air-fuel ratio (A/F)in depend on the change in concentration of the hydrocarbons in the exhaust gas which flows into the exhaust purification catalyst 13, so it can be said that, the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in. FIG. 4, the more to the rich side the air-fuel ratio (A/F)in becomes, the higher the hydrocarbon concentration.

Figure 5:
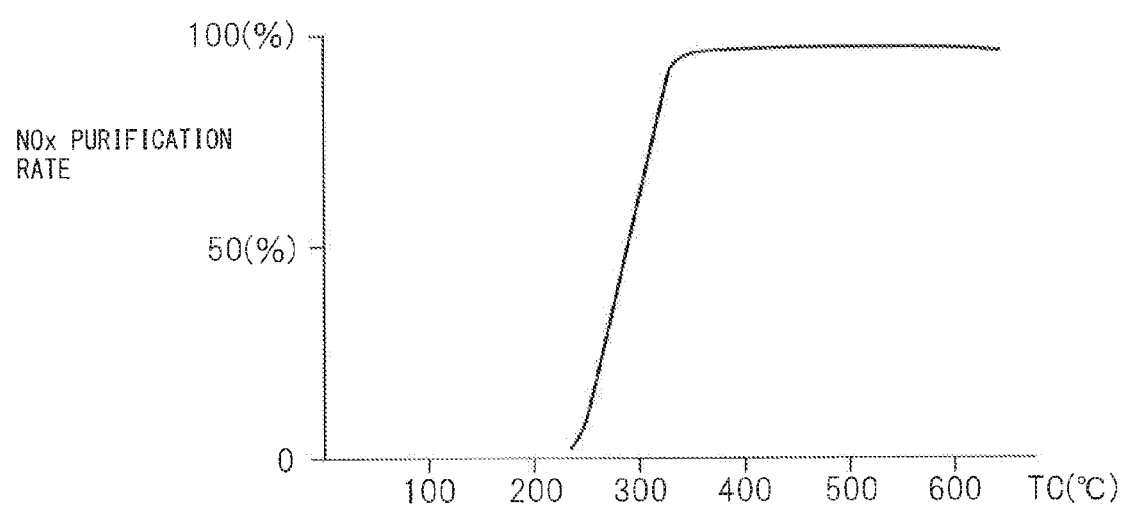
FIG. 5 is a view which shows an $NO_X$ purification rate.

FIG. 5 shows the $NO_X$ purification rate by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_X$ purification for a long time. In the process of research, they learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate is obtained even in a 400° C. or higher high temperature region.

Figure 6A:
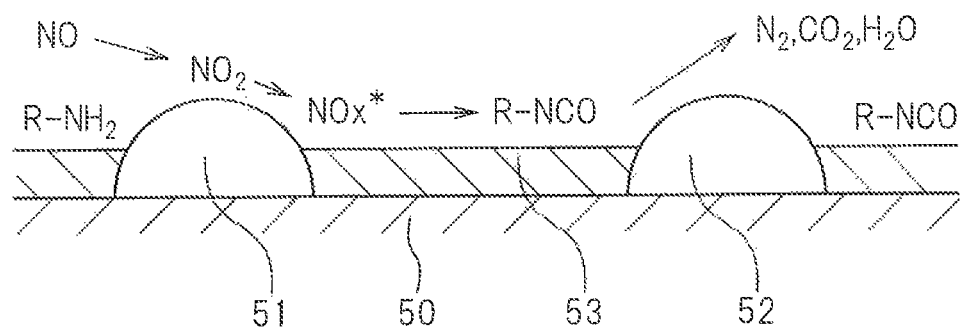
FIGS. 6A and 6B are views for explaining an oxidation reduction reaction in an exhaust purification catalyst.
Figure 6B:
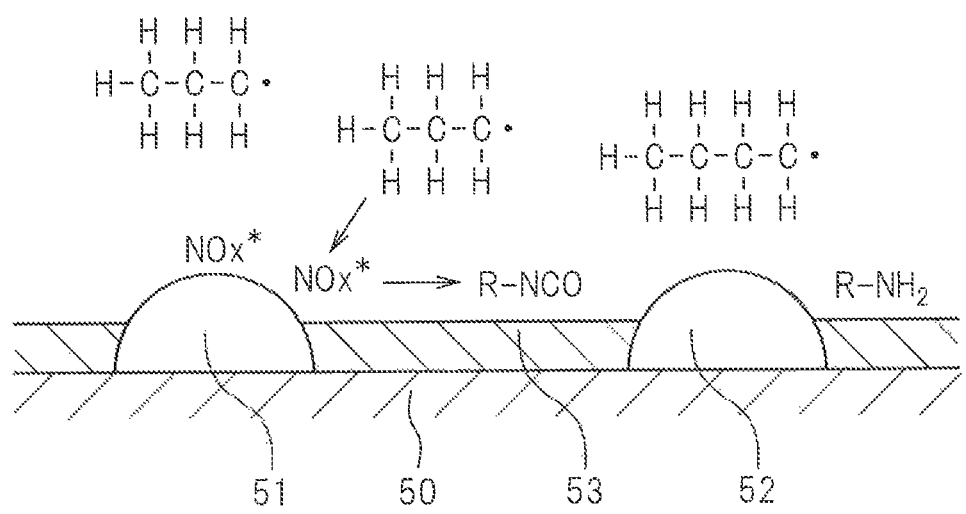

Furthermore, at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13. It is learned that the reducing intermediates play a central role in obtaining a high $NO_X$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed, in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrite compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On she other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed and thereby the concentration of oxygen around the reducing intermediates becomes higher, the reducing intermediates react with the $NO_X$ in the exhaust gas and the active $NO_X^*$, or react with the surrounding oxygen, or break down on their own. Due to this, as shown in FIG. 6A, the reducing intermediates R—NCO and R—$NH_2$ are converted to $N_2$, $CO_2$, and $H_2O$, therefore the $NO_X$ is removed.

In this way, in the exhaust purification catalyst 13, by making the concentration of hydrocarbons which flow into the exhaust purification catalyst 13 higher, reducing intermediates are produced. When the concentration of hydrocarbons which flow into the exhaust purification catalyst 13 is lowered, then the oxygen concentration is raised, the reducing intermediates react with the $NO_X$ in the exhaust gas, the active $NO_X^*$ and oxygen, or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_X$ in the exhaust gas, the active $NO_X^*$ and oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_X$ in the exhaust gas, the active $NO_X^*$ and oxygen or break down themselves. For this reason, the basic exhaust gas flow surface parts 54 are provided.

On the other hand, if lengthening the feed period, of the hydrocarbons, the length of time during which the oxygen concentration becomes higher becomes longer in the period after the hydrocarbons are fed until the hydrocarbons are next fed. Therefore, the active $NO_X^*$ is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in this embodiment of the present invention, to make the $NO_X$ which is contained, in the exhaust gas and the reformed hydrocarbons react and produce the reducing intermediates R—NCO and R—$NH_2$ containing nitrogen and hydrocarbons, the precious metal catalysts 51 and 52 are carried, on the exhaust gas flow surface of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51 and 52. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period, required for continuation of the production of the reducing intermediates R—NCO and R—NH$_2$. Incidentally, in the example shown in FIG. 4, the injection interval is made 3 seconds.

Figure 7A:
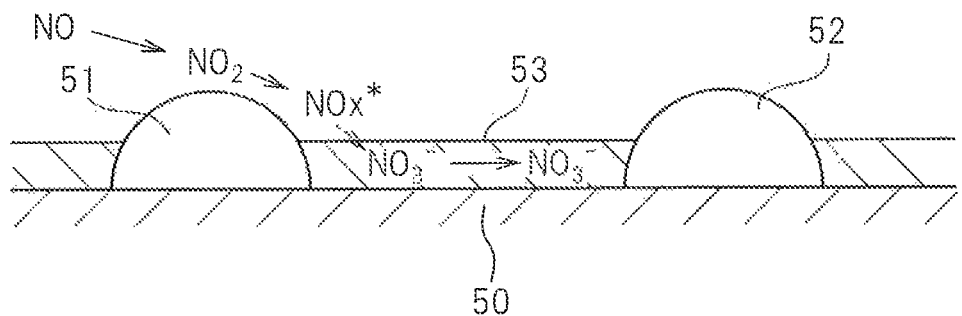
FIGS. 7A and 7B are views for explaining an oxidation redaction reaction in an exhaust purification catalyst.

If the vibration period of the hydrocarbon concentration, that is, the feed period of the hydrocarbons HC, is made longer than the above predetermined range of period, the reducing intermediates R—NCO and R—NH$_2$ disappear from the surface of the basic layer 53. At this time, the active NO$_X$* which was produced on the platinum Pt 53, as shown in FIG. 7A, diffuses in the basic layer 53 in the form of nitrate ions NO$_3^-$ and becomes nitrates. That is, at this time, the NO$_X$ in the exhaust gas is absorbed in the form of nitrates inside of the basic layer 53.

Figure 7B:
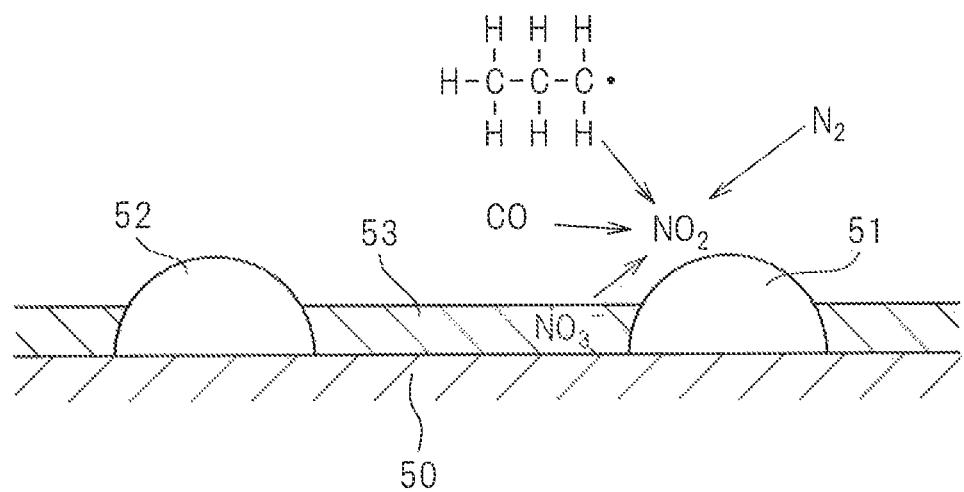

On the other hand, FIG. 7B shows the case where the air-fuel ratio of the exhaust gas which flows into the exhaust purification catalyst 13 is made the stoichiometric air-fuel ratio or rich when, the NO$_X$ is absorbed in the form of nitrates inside of the basic layer 53. In this case, the oxygen concentration in the exhaust gas falls, so the reaction proceeds in the opposite direction (NO$_3^- \rightarrow$NO$_2$), and consequently the nitrates absorbed in the basic layer 53 successively become nitrate ions NO$_3^-$ and, as shown in FIG. 7B, are released from the basic layer 53 in the form of NO$_2$. Next, the released NO$_2$ is reduced by the hydrocarbons HC and CO contained in the exhaust gas.

Figure 8:
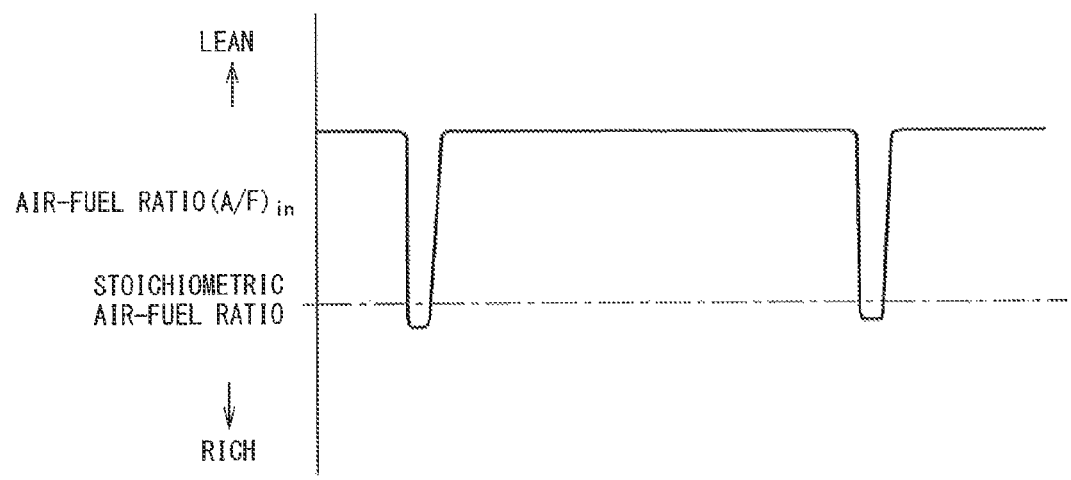
FIG. 8 is a view which shows changes in an air-fuel ratio of exhaust gas which flows into an exhaust purification catalyst.

FIG. 8 shows the case of making the air-fuel ratio (A/F)in of the exhaust gas which flows into the exhaust purification catalyst 13 temporarily rich slightly before the NO$_X$ absorption ability of the basic layer 53 becomes saturated. Note that, in the example shown in FIG. 8, the time interval of this rich control is 1 minute or more. In this case, the NO$_X$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing NO$_X$.

Note that, at this time, sometimes the basic layer 53 temporarily adsorbs the NO$_X$. Therefore, if using term of "storage" as a term including both "absorption" and "adsorption", at this time, the basic layer 53 performs the role of an NO$_X$ storage agent for temporarily storing the NO$_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an NO$_X$ storage catalyst which stores the NO$_X$ when the air-fuel ratio of the exhaust gas is lean and releases the stored NO$_X$ when the oxygen concentration in the exhaust gas falls.

Figure 9:
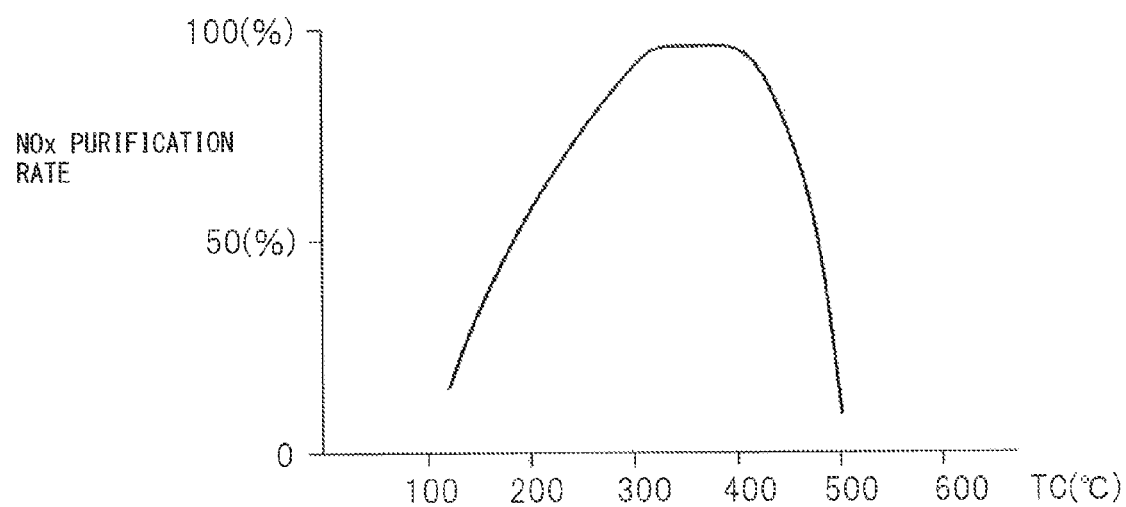
FIG. 9 is a view which shows an $NO_X$ purification rate.

FIG. 9 shows the NO$_X$ purification rate when making the exhaust purification catalyst 13 function as an NO$_X$ storage catalyst in this way. Note that, the abscissa of the FIG. 9 shows the catalyst temperature TC of the exhaust purification catalyst 13. When making the exhaust purification catalyst 13 function as an NO$_X$ storage catalyst, as shown in FIG. 9, when the catalyst temperature TG is 300° C. to 400° C., an extremely high NO$_X$ purification rate is obtained, but when the catalyst temperature TC becomes a 400° C. or higher high temperature, the NO$_X$ purification rate falls.

In this way, when the catalyst temperature TC becomes 400° C. or more, she NO$_X$ purification rate falls because if the catalyst temperature TC becomes 400° C. or more, NO$_X$ is less easily stored in the exhaust purification catalyst 13, and the nitrates break down by heat and are released in the form of NO$_2$ from the exhaust purification catalyst 13. That is, so long as storing NO$_X$ in the form of nitrates, when the catalyst temperature TC is high, it is difficult to obtain a high NO$_X$ purification rate. However, in the new NO$_X$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TC is high, a high NO$_X$ purification rate is obtained.

Therefore, in an embodiment of the present invention, to use this new NO$_X$ purification method to be able to remove NO$_X$, the hydrocarbon feed valve 15 for feeding hydrocarbons is arranged inside of the engine exhaust passage, the exhaust purification catalyst 13 for causing NO$_X$ contained in exhaust gas and reformed hydrocarbons to react is arranged downstream of the hydrocarbon feed valve 15 in the engine exhaust passage, precious metal catalysts 51 and 52 are carried on the exhaust gas flow surface of the exhaust purification catalyst 13, basic exhaust gas flow surface parts 54 are formed around the precious metal catalysts 51 and 52, the exhaust purification catalyst 13 has the property of reducing the NO$_X$ which is contained, in exhaust gas if the concentration of hydrocarbons which flow into the exhaust purification catalyst 13 is made to vibrate by within a predetermined range of amplitude and within a predetermined range of period and has the property of being increased in storage amount of NO$_X$ which is contained in exhaust gas if the vibration period of the hydrocarbon concentration is made longer than this predetermined range, and, at the time of engine operation, the hydrocarbons is injected from the hydrocarbon feed valve 15 at a predetermined period to thereby reduce the NO$_X$ which is contained in the exhaust gas in the exhaust purification catalyst 13.

That is, the NO$_X$ purification method which is shown from FIG. 4 to FIGS. 6A and 63 can be said to be a new NO$_X$ purification method designed to remove NO$_X$ without forming almost any nitrates in the case of using an exhaust purification catalyst which carries precious met ail catalysts and forms a basic layer which can absorb NO$_X$. In actuality, when using this new NO$_X$ purification method, the nitrates which, are detected from the basic layer 53 become much smaller in amount compared with the case where making the exhaust purification catalyst 13 function as an NO$_X$ storage catalyst. Note that, this new NO$_X$ purification method will be referred to below as the "first NO$_X$ removal method".

Next, referring to FIG. 10 to FIG. 15, this first NO$_X$ removal method will be explained in a bit more detail.

Figure 10:
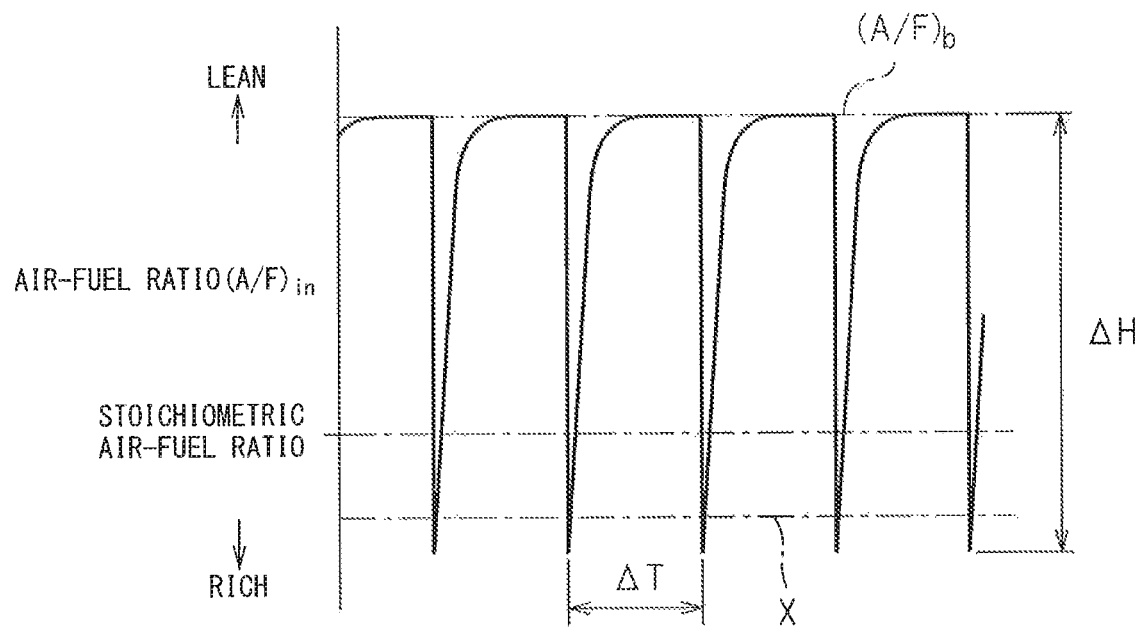
FIG. 10 is a time chart which shows changes in an air-fuel ratio of exhaust gas which flows into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas which flows into this exhaust purification catalyst 13 simultaneously snows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X snows the upper limit of the air-fuel ratio (A/F)in used for producing the reducing intermediates without the produced active NO$_X$* being stored in the form of nitrates inside the basic layer 53 much at all. To make the active $NO_X^*$ and the reformed hydrocarbons react to produce reducing intermediates, the air-fuel ratio (A/F)in has to be made lower than this upper limit X of the air-fuel ratio.

In other words, in FIG. 10, X shows the lower limit of the hydrocarbon concentration required for making the active $NO_X^*$ and reformed hydrocarbons react to produce reducing intermediates. To produce the reducing intermediates, the hydrocarbon concentration has to be made higher than this lower limit X. In this case, whether the reducing intermediates are produced is determined by the ratio of the oxygen concentration and hydrocarbon concentration around the active $NO_X^*$, that is, the air-fuel, ratio (A/F)in. The upper limit X of the air-fuel ratio required for producing the reducing intermediates will below be called the "demanded minimum air-fuel ratio".

In the example shown in FIG. 10, the demanded minimum air-fuel ratio X is rich, therefore, in this case, to form the reducing intermediates, the air-fuel ratio (A/F)in is instantaneously made the demanded minimum air-fuel ratio X or less, that is, rich. As opposed to this, in the example shown, in FIG. 11, the demanded minimum air-fuel ratio X is lean. In this case, the air-fuel ratio (A/F)in is maintained lean while periodically reducing the air-fuel ratio (A/F)in so as to form the reducing intermediates.

In this case, whether the demanded minimum air-fuel ratio X becomes rich or becomes lean depends on the oxidizing power of the exhaust purification catalyst 13. In this case, the exhaust purification catalyst 13, for example, becomes stronger in oxidizing power if increasing the carried amount of the precious metal 51 and becomes stronger in oxidizing power if strengthening the acidity. Therefore, the oxidizing power of the exhaust purification catalyst 13 changes due to the carried amount of the precious metal 51 or the strength of the acidity.

Figure 11:
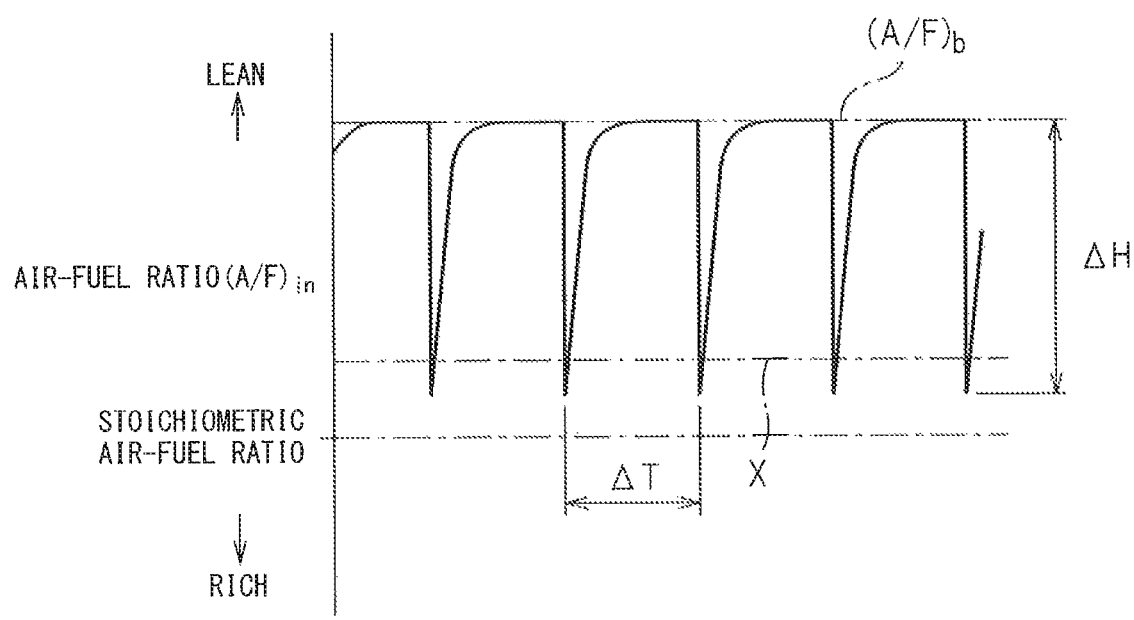
FIG. 11 is a time chart which shows changes in an air-fuel ratio of exhaust gas which flows into an exhaust purification catalyst.

Now, if using an exhaust purification catalyst 13 with a strong oxidizing power, as shown in FIG. 11, if maintaining the air-fuel ratio (A/F)in lean while periodically lowering the air-fuel ratio (A/F)in, the hydrocarbons end up becoming completely oxidized when the air-fuel, ratio (A/F)in is reduced. As a result, reducing intermediates can no longer be produced. As opposed to this, when using an exhaust purification catalyst 13 with a strong oxidizing power, as shown in FIG. 10, if making the air-fuel ratio (A/F)in periodically rich, when the air-fuel ratio (A/F)in is made rich, part of the hydrocarbons will not be completely oxidized, but will be partially oxidized, that is, the hydrocarbons will be reformed, consequently reducing intermediates will be produced. Therefore, when using an exhaust purification catalyst 13 with a strong oxidizing power, the demanded minimum air-fuel ratio X has to be made rich.

On the other hand, when using an exhaust purification catalyst 13 with a weak oxidizing power, as shown in FIG. 11, if maintaining the air-fuel ratio (A/F)in lean while periodically lowering the air-fuel ratio (A/F)in, part of the hydrocarbons will not be completely oxidized, but will be partially oxidized, that is, the hydrocarbons will be reformed, and consequently reducing intermediates will be produced. As opposed to this, when using am exhaust purification catalyst 13 with a weak oxidizing power, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing power, the demanded minimum air-fuel ratio X has to be made lean.

Figure 12:
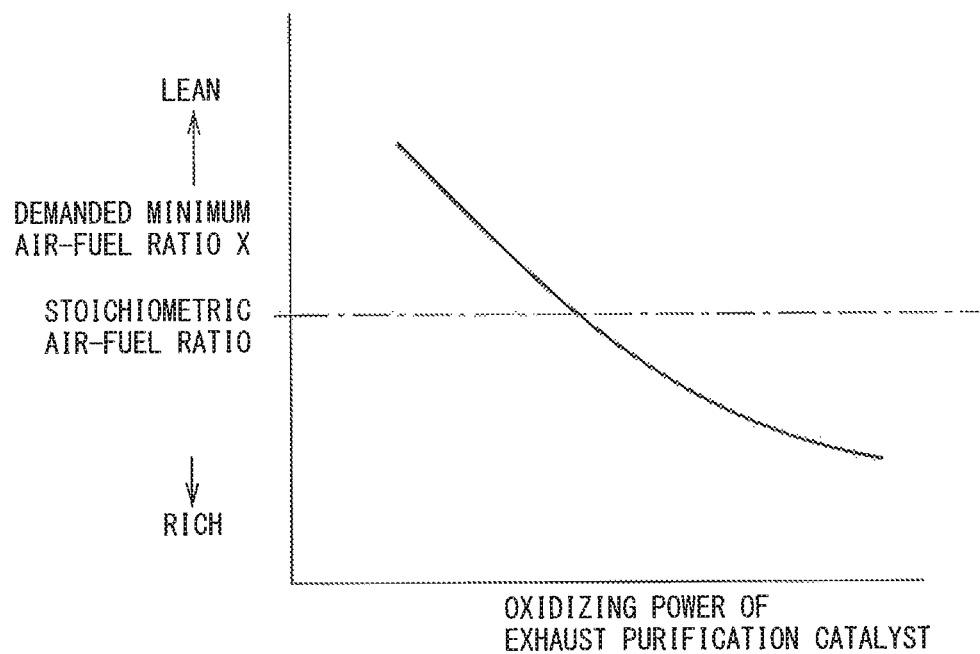
FIG. 12 is a view which shows a relationship between an oxidizing power of an exhaust purification catalyst and a demanded minimum air-fuel ratio X.

That is, it is learned that the demanded minimum air-fuel ratio X, as shown in FIG. 12, has to be reduced the stronger the oxidizing power of the exhaust purification catalyst 13. In this way, the demanded minimum air-fuel ratio X becomes lean or rich due to the oxidizing power of the exhaust purification catalyst 13. Below, taking as example the case where the demanded minimum air-fuel ratio X is rich, the amplitude of the change in concentration of hydrocarbons which flow into the exhaust purification catalyst 13 and the vibration period of the concentration of hydrocarbons which flow into the exhaust purification catalyst 13 will be explained.

Now, if the base air-fuel ratio (A/F)b becomes larger, that, is, if the oxygen concentration, in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which do not contribute to the production of the reducing intermediates also increases. In this case, to remove the $NO_X$ well, as explained above, it is necessary to make the excess hydrocarbons oxidize. Therefore, to remove the $NO_X$ well, the larger the amount of excess hydrocarbons, the larger the amount of oxygen which is required.

In this case, if raising the oxygen concentration in the exhaust gas, the amount of oxygen can be increased. Therefore, to remove the $NO_X$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
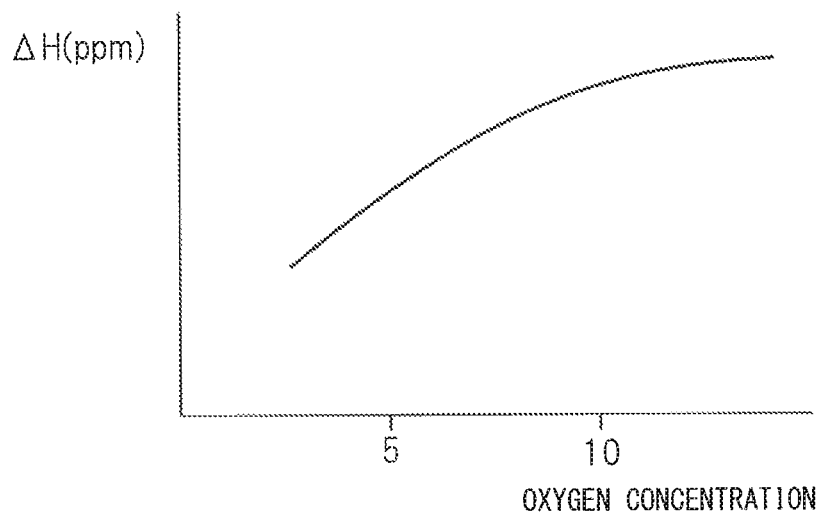
FIG. 13 is a view which shows a relationship between a concentration of oxygen in exhaust gas and an amplitude ΔH of hydrocarbon concentration which gives the same $NO_X$ purification rate.

FIG. 13 shows the relationship between the oxygen concentration in the exhaust gas before the hydrocarbons are fed and the amplitude $\Delta H$ of the hydrocarbon concentration when the same $NO_X$ purification rate is obtained. To obtain the same $NO_X$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_X$ purification rate, the higher the base air-fuel ratio (A/F)b, the greater the amplitude $\Delta H$ of the hydrocarbon concentration has to be made. In other words, to remove the $NO_X$ well, the lower the base air-fuel ratio (A/F)b, the more the amplitude $\Delta H$ of the hydrocarbon concentration can be reduced.

Figure 14:
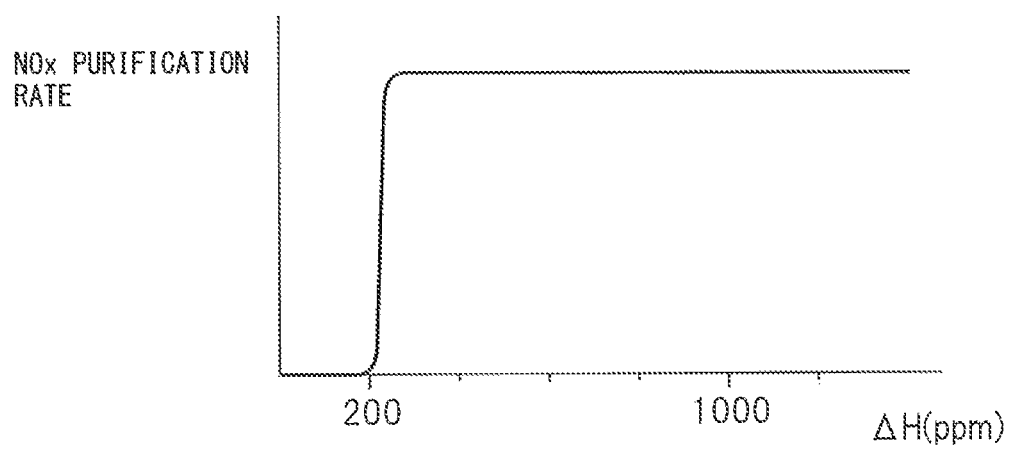
FIG. 14 is a view which shows a relationship between an amplitude ΔH of hydrocarbon concentration and an $NO_X$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_X$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_X$ purification rate can be obtained.

On the other hand, it is learned that, when the base air-fuel ratio (A/F)b is the highest, if making the amplitude $\Delta H$ of the hydrocarbon concentration 10000 ppm or so, an excellent $NO_X$ purification rate is obtained. Therefore, in the present invention, the predetermined range of the amplitude of the hydrocarbon concentration is made 200 ppm to 10000 ppm.

Figure 15:
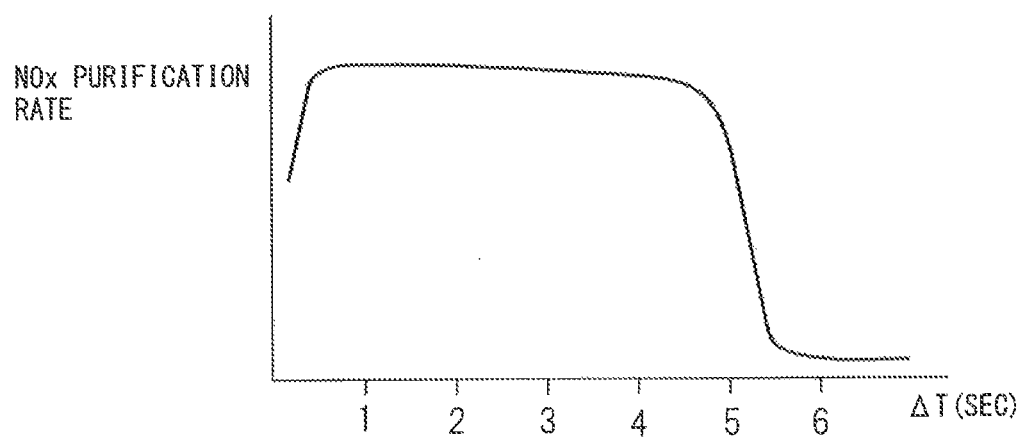
FIG. 15 is a view which shows a relationship between a vibration period ΔT of hydrocarbon concentration and an $NO_X$ purification rate.

Further, if the vibration period $\Delta T$ of the hydrocarbon, concentration becomes longer, the time period where the oxygen concentration around the active $NO_X^*$ becomes higher becomes longer in the time period after the hydrocarbons are fed to when the hydrocarbons are next fed. In this case, in the embodiment which is shown in FIG. 1, if the vibration period ΔT of the hydrocarbon concentration becomes longer than about 5 seconds, the active $NO_X^*$ starts to be absorbed in the form of nitrates inside the basic layer 53. Therefore, as shown in FIG. 15, if the vibration period ΔT of the hydrocarbon concentration becomes longer than about 5 seconds, the $NO_X$ purification rate falls. Therefore, the vibration period ΔT of the hydrocarbon concentration has to be made 5 seconds or less.

On the other hand, in this embodiment according to the present invention, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_X$ purification rate falls. Therefore, in the present invention, the vibration period of the hydrocarbon concentration is made from 0.3 second to 5 seconds.

Figure 16A:
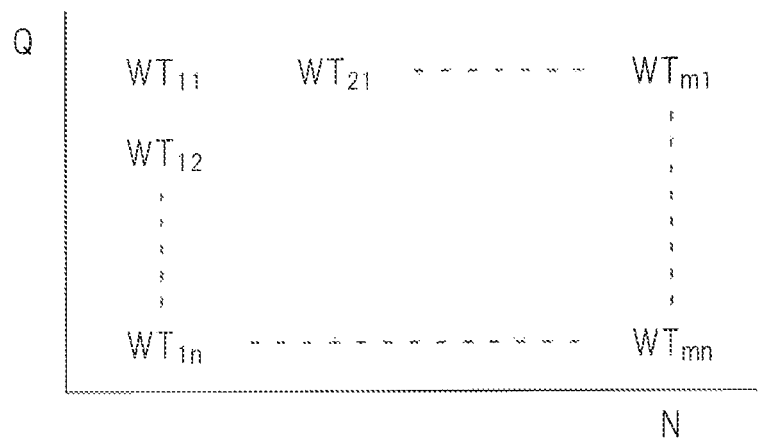
FIGS. 16A and 16B are views which show the injection time of hydrocarbons etc.
Figure 16B:
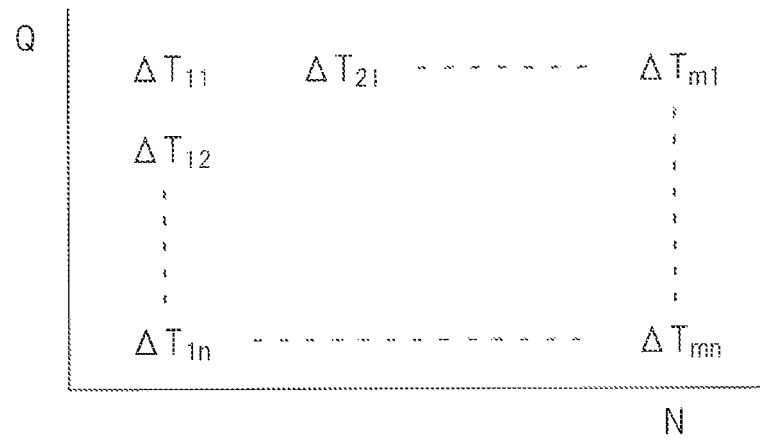

Now then, in this embodiment according to the present invention, control is performed so as to change the injection amount and injection timing of hydrocarbons from the hydrocarbon feed valve 15 so that the amplitude ΔH and vibration period ΔT of the hydrocarbon concentration become the optimal values for the engine operating state. In this case, in this embodiment according to the present invention, the optimum hydrocarbon injection amount WT when an $NO_X$ purification action by the first $NO_X$ removal method is performed while performing an exhaust gas recirculation action by the low pressure exhaust gas recirculation system LPL is stored as a function of the injection amount Q from fuel injectors 3 and the engine speed N in the form of a map such as shown in FIG. 16A in advance in the ROM 32. Further, the optimum injection period ΔT of hydrocarbons in this time is stored as a function of the injection amount Q from the fuel injectors 3 and the engine speed N in the form of a map such as shown in FIG. 16B in advance in the ROM 32. Simultaneously, the optimum hydrocarbon injection amount WT and injection period ΔT when an $NO_X$ purification action by the first $NO_X$ removal method is performed while performing an exhaust gas recirculation action by the high pressure exhaust gas recirculation system HPL are also stored as functions of the injection amount Q from the fuel injectors 3 and the engine speed N respectively in advance in the ROM 32.

In this regard, if hydrocarbons are injected from the hydrocarbon feed valve 15, part of the hydrocarbons is partially oxidized, but the majority of the hydrocarbons is completely oxidized. Therefore, if hydrocarbons are injected from the hydrocarbon feed valve 15, a large amount of carbon dioxide $CO_2$ is generated at the exhaust purification catalyst 13. At this time, if assuming the exhaust gas recirculation action is performed by the low pressure exhaust gas recirculation system LPL, the large amount of carbon dioxide $CO_2$ which is generated as the exhaust purification catalyst 13 is recirculated through the EGR passage 23 of the low pressure exhaust gas recirculation system LPL and the intake passages 6a and 6b to the inside of the combustion chamber 2. In this way, if a large amount of carbon dioxide $CO_2$ is recirculated to the inside of the combustion chamber 2, the amount of air which is fed to the inside of the combustion chamber 2 temporarily decreases and the air-fuel ratio of the gas which is burned in the combustion chamber 2 temporarily drops. As a result, the air-fuel ratio of the exhaust gas which is exhausted from the combustion chamber 2, that is, the air-fuel ratio of the exhaust gas which flows into the exhaust purification catalyst 13, temporarily drops.

FIG. 17 shows the change in the air-fuel ratio (A/F)in of the exhaust gas flowing into the exhaust purification catalyst 13, the change in concentration of the boon dioxide $CO_2$ flowing out from the exhaust purification catalyst 13, and the change in the base air-fuel ratio in the combustion chamber 2 at this time, that is, when hydrocarbons are injected from the hydrocarbon feed valve 15 in a state that, the exhaust gas recirculation action by the low pressure exhaust gas recirculation system LPL is performed. As shown in FIG. 17, if, at the time $t_1$, hydrocarbons are injected from the hydrocarbon feed valve 15, the air-fuel ratio (A/F)in of the exhaust gas flowing into the exhaust purification catalyst 13 becomes temporarily rich. At this time, the carbon dioxide $CO_2$ flowing out from the exhaust purification catalyst 13 becomes temporarily higher in concentration. As a result, the base air-fuel ratio in the combustion chamber 2 temporarily falls and the air-fuel ratio of the exhaust gas exhausted from the combustion chamber 2 temporarily falls. Due to this, at the time $t_2$, the air-fuel ratio (A/F)in of the exhaust gas flowing into the exhaust purification catalyst 13 temporarily falls. That is, if the carbon dioxide $CO_2$ produced due to the injection of hydrocarbons is recirculated and reaches the inlet of the exhaust purification catalyst 13, this will cause the air-fuel ratio (A/F)in of the exhaust gas flowing into the exhaust purification catalyst 13 to temporarily fall.

On the other hand, if the carbon dioxide $CO_2$ produced due to the injection of hydrocarbons is recirculated and reaches the inlet of the exhaust purification catalyst 13, this carbon dioxide $CO_2$ will again be recirculated. As a result, at the time $t_3$, the air-fuel ratio (A/F)in of the exhaust gas flowing into the exhaust purification catalyst 13 will again fall. If, in this way, hydrocarbons are injected from, the hydrocarbon feed valve 15 when the exhaust gas recirculation action by the low pressure exhaust gas recirculation system LPL is performed, after the injection of hydrocarbons, each time the time required for recirculation of the carbon dioxide passes, a temporary drop in the air-fuel ratio (A/F)in of the exhaust gas flowing into the exhaust purification catalyst 13 is repeatedly caused. In this case, as shown in FIG. 17, the amount of drop in the air-fuel ratio of the exhaust gas flowing into the exhaust purification catalyst 13 is the largest when the produced carbon dioxide $CO_2$ is first recirculated and reaches the inlet of the exhaust purification catalyst 13. When the carbon dioxide $CO_2$ which reaches the inlet of the exhaust purification catalyst 13 is recirculated the second time and reaches the inlet of the exhaust purification catalyst 13, the amount of drop of the air-fuel ratio of the exhaust gas considerably decreases. When the carbon dioxide $CO_2$ is recirculated the third time and reaches the inlet of the exhaust purification catalyst 13 the amount of drop of the air-fuel ratio of the exhaust gas decreases even more.

Now then, FIG. 17 shows the hydrocarbon injection control which is performed most frequently when the first $NO_x$ removal method, is being used for the $NO_x$ removal action. In this case, the injection period of hydrocarbons is longer than 1 second. As opposed, to this, in an automobile-use internal combustion engine such as shown in FIG. 1, the time which the carbon dioxide requires for recirculation, that is, in FIG. 17, the time from $t_1$ to $t_2$, or the time from $t_2$ to $t_3$, is considerably shorter than 1 second. Therefore, usually, the injection action of hydrocarbons and the drop in the air-fuel ratio (A/F)in of the exhaust gas flowing into the exhaust purification catalyst 13 which is shown at the time $t_2$ or the time $t_3$ will never overlap. However, at the time of engine high speed high load operation when the engine load is extremely high and the amount of generation of $NO_x$ is large or when increasing the amount of injection of hydrocarbons per unit time to raise the temperature of the particulate filter 14 or the exhaust purification catalyst 13, sometimes the injection action of hydrocarbons and the drop in the air-fuel ratio (A/F)in of the exhaust gas flowing into the exhaust purification catalyst 13 will overlap.

Figure 18:
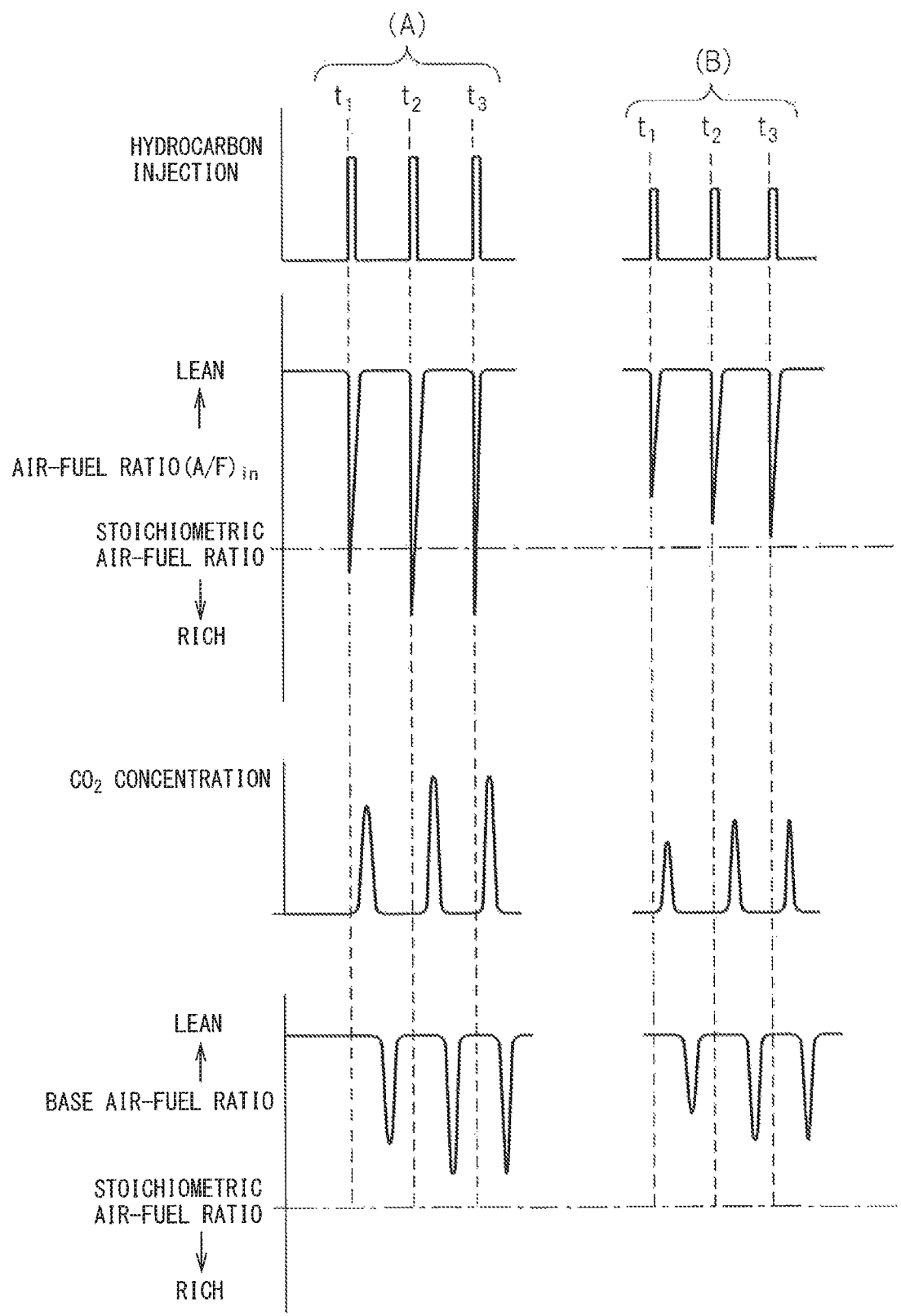
FIG. 18 is a view which shows changes in the air-fuel ratio of the exhaust gas which flows into an exhaust purification catalyst, etc.

In FIG. 18, (A) shows the case where the injection action of hydrocarbons and the drop in the air-fuel, ratio (A/F)in of the exhaust gas flowing into the exhaust purification catalyst 13 overlap at the time of engine high speed high load operation of an extremely high engine load when the $NO_x$ removal action by the first $NO_x$ removal method is performed, while in FIG. 18, (B) shows the case where the injection action of hydrocarbons and the drop in the air-fuel ratio (A/F)in of the exhaust gas flowing into the exhaust, purification catalyst 13 overlap when increasing the amount of injection of hydrocarbons per unit time so as to raise the temperature of the particulate filter 14 or exhaust purification catalyst 13. Note that, FIG. 18, in the same way as FIG. 17, shows the change in the air-fuel ratio (A/F)in of the exhaust gas flowing into the exhaust purification catalyst 13, the change in concentration of the carbon dioxide $CO_2$ flowing out from the exhaust purification catalyst 13, and the change in the base air-fuel ratio in the combustion chamber 2 at these times.

Now then, when in this way the injection action of hydrocarbons and the drop in the air-fuel ratio (A/F)in of the exhaust gas flowing into the exhaust purification catalyst 13 overlap, the base air-fuel ratio in the combustion chamber 2 falls and as a result combustion becomes less easily, so a crop in the torque generated by the engine is caused. However, at this time, when, like in the case which is shown in FIG. 18, (A), an engine high speed high load operation with an extremely high engine load is being performed, the amount of fuel injection is large, so the combustion is stable and even if the amount of carbon dioxide $CO_2$ fed into the combustion chamber 2 is increased, the torque generated by the engine will not fall that much. Further, when an engine high speed high load operation is being performed, the interval between generation of torque is short, so even if the generated torque falls in any of the cylinders, the passengers will not feel much of a drop in torque as well. That is, at the time of engine high speed high load operation with an extremely high engine load, even if the injection action of hydrocarbons and the drop in the air-fuel ratio (A/F)in of the exhaust gas flowing into the exhaust purification catalyst 13 overlap and the torque generated by the engine falls, the passengers will not be given an odd feeling.

Due to this, at the time of an engine high speed high load operation when an $NO_x$ removal action by the first $NO_x$ removal method is being performed, if the injection action of hydrocarbons and the drop in the air-fuel ratio (A/F)in of the exhaust gas flowing into the exhaust purification catalyst 13 overlap, the degree of richness of the air-fuel ratio (A/F)in of the exhaust gas flowing into the exhaust purification catalyst 13 can be raised and, therefore, an amount of reducing intermediate sufficient for removing the $NO_x$ can be produced. As a result, the $NO_x$ purification rate can be improved. Therefore, in the present invention, if the $NO_x$ removal action by the first $NO_x$ removal method is being performed, when an engine high speed high load operation is being performed, the injection action of hydrocarbons and the drop in the air-fuel ratio (A/F)in of the exhaust, gas flowing into the exhaust purification catalyst 13 are allowed to overlap.

As opposed to this, as shown in FIG. 18, (B), when increasing the amount of injection of hydrocarbons per unit time so as to raise the temperature of the particulate filter 14 or the exhaust purification catalyst 13, the situation differs somewhat when the injection action of hydrocarbons and the drop in the air-fuel ratio (A/F)in of the exhaust gas flowing into the exhaust purification catalyst 13 overlap. That is, such a temperature elevation action of the particulate filter 14 or the exhaust purification catalyst 13 is also performed at the time of engine low speed low load, operation. In this regard, when an engine low speed low load, operation is being performed, the amount of fuel injection, is small, so the combustion does not become stable. Therefore, at this time, if the amount of carbon dioxide $CO_2$ fed into the combustion chamber 2 increases, the torque generated by the engine greatly falls. Further, when engine low speed low load operation is being performed, the torque generating interval is long, so if the generated torque at any of the cylinders falls, the passengers strongly feel the drop in torque. That is, at the time of engine low speed low load operation, if the injection action of hydrocarbons and the drop in the air-fuel ratio (A/F)in of the exhaust gas flowing into the exhaust purification catalyst 13 overlap and the torque generated by the engine falls, the passengers will be given an odd feeling.

Therefore, in the present invention, when increasing the amount of injection of hydrocarbons per unit time so as to raise the temperature of the particulate filter 14 or exhaust purification catalyst 13, hydrocarbons are injected from the hydrocarbon feed valve 15 so that the injection action of hydrocarbons and the drop in the air-fuel ratio (A/F)in of the exhaust gas flowing into the exhaust purification catalyst 13 do not overlap. Next, referring to FIG. 19, this will be explained in detail. Note that, FIG. 13, in the same way as FIG. 17, shows the change in the air-fuel ratio (A/F)in of the exhaust gas flowing into the exhaust purification catalyst 13, the change in concentration of the carbon dioxide $CO_2$ flowing out from the exhaust purification catalyst 13, and the change in the base air-fuel ratio in the combustion chamber 2 when hydrocarbons are injected from the hydrocarbon feed valve 15. Further, FIG. 19, to facilitate understanding, shows the time of the abscissa extended compared with FIG. 17.

Figure 19:
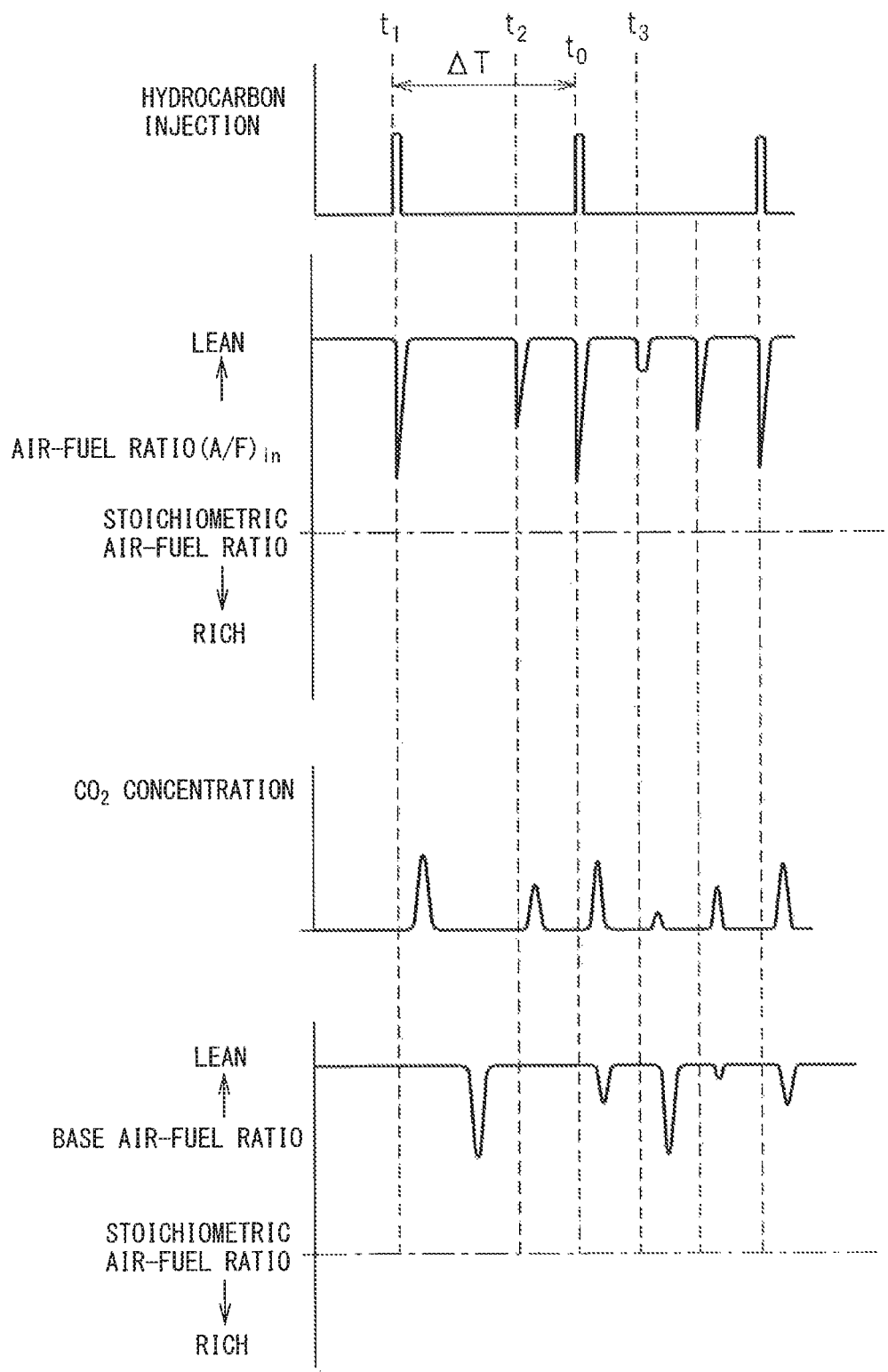
FIG. 19 is a view which shows changes in the air-fuel ratio of the exhaust gas which flows into an exhaust purification catalyst, etc.

In FIG. 19, if hydrocarbons are injected from the hydrocarbon feed valve 15 at the time $t_1$, a first drop in the air-fuel ratio (A/F)in of the exhaust gas flowing into the exhaust purification catalyst 13 occurs at the time $t_2$, while a second drop in the air-fuel ratio (A/F)in of the exhaust gas flowing into the exhaust purification catalyst 13 occurs at the time $t_3$. In the example which is shown in FIG. 19, the next injection action of hydrocarbons is performed so as not to overlap with these drops in the air-fuel ratio (A/F)in of the exhaust gas flowing into the exhaust purification catalyst 13. As a result, the amount of drop of the base air-fuel ratio in the combustion chamber 2 becomes smaller and the amount of drop of the torque generated by the engine becomes smaller, so the odd feeling which is given to the passengers can be suppressed.

That is, in the present invention, in an exhaust purification system of an internal combustion engine in which a hydrocarbon feed valve 15 is arranged in an engine exhaust passage, an exhaust purification catalyst 13 and a particulate filter 14 are arranged downstream of the hydrocarbon feed valve 15 in the engine exhaust passage, a precious metal catalyst 51,52 is carried on an exhaust gas flow surface of the exhaust purification catalyst 13, a basic exhaust gas flow surface part 54 is formed around the precious metal, catalyst 51,52, the exhaust purification catalyst 13 has a property of reducing $NO_X$ contained in an exhaust gas when making a concentration of hydrocarbons which flow into the exhaust purification catalyst 13 vibrate within a predetermined range of amplitude and within a predetermined range of period and has a property of being increased in storage amount of $NO_X$ contained in the exhaust gas if making the vibration period of the hydrocarbon concentration longer than the predetermined range, and hydrocarbons are injected from the hydrocarbon feed valve 15 within the predetermined period at the time of engine operation to thereby remove $NO_X$ contained in the exhaust gas, the exhaust purification system comprises a low pressure exhaust gas recirculation system LPL which makes an exhaust gas in the engine exhaust passage downstream of the exhaust purification catalyst 13 and particulate filter 14 recirculate to an inside of an intake passage, wherein if hydrocarbons are injected from the hydrocarbon feed valve 15 when an exhaust gas recirculation action by said low pressure exhaust gas recirculation system LPL is performed, a carbon dioxide produced in the exhaust purification catalyst 13 is recirculated and after the injection of hydrocarbons, each time the time which is required for recirculation of the carbon dioxide elapses, a temporary drop in an air-fuel ratio of an inflowing exhaust gas which flows into the exhaust purification catalyst 13 and particulate filter 14 is repeatedly caused. An injection of hydrocarbons from the hydrocarbon feed valve 15 which is synchronized with the temporary drop in air-fuel ratio of the inflowing exhaust gas is allowed when hydrocarbons are injected from the hydrocarbon feed valve 15 within the predetermined period for removing $NO_x$ which is contained in the exhaust gas, and hydrocarbons are injected from the hydrocarbon feed valve 15 so as not to overlap with the temporary drop in the air-fuel ratio of the inflowing exhaust gas when hydrocarbons are periodically injected from the hydrocarbon feed valve 15 for temperature elevation control of at least one of the particulate filter 14 and exhaust purification, catalyst 13.

In this case, in this embodiment according to the present invention, as shown in FIG. 19, after the injection of hydrocarbons, the next injection action of hydrocarbons from, the hydrocarbon feed valve 15 is performed in the interval between two temporary drops of air-fuel ratio of the inflowing exhaust gas which are caused after this injection of hydrocarbons. At this time, in the example which is shown in FIG. 19, after the injection of hydrocarbons at the time $t_1$, between the temporary drop of the air-fuel ratio of the inflowing exhaust gas which is first caused at the time $t_2$ due to this injection of hydrocarbons and the temporary drop in the air-fuel ratio of the inflowing exhaust gas which is next caused at the time $t_3$, the next injection action of hydrocarbons from the hydrocarbon feed valve 15 is performed. Note that, if the next injection action of hydrocarbons from the hydrocarbon feed valve 15 is performed before the temporary drop in the air-fuel ratio of the inflowing exhaust gas is first caused at the time $t_2$ after the injection of hydrocarbons at the time $t_1$, there is a high possibility of the injection action of hydrocarbons and the drop in the air-fuel ratio (A/F)in of the exhaust gas which flows into the exhaust purification catalyst 13 overlapping. Therefore, as shown in FIG. 19, the next injection action of hydrocarbons from the hydrocarbon feed valve 15 is performed after the injection of hydrocarbons at the time $t_1$ and after the temporary drop in the air-fuel ratio of the inflowing exhaust gas at the time $t_2$ is first caused due to this injection of hydrocarbons.

As shown in FIG. 19, the amount of injection of hydrocarbons per unit time is made to increase when temperature elevation control of the particulate filter 14 or the exhaust purification catalyst 13 is performed. In this case, the temperature elevation control of the particulate filter 14 is temperature elevation control for regenerating the particulate filter 14, while the temperature elevation control of the exhaust purification catalyst 13 is temperature elevation control for releasing $SO_x$ from, the exhaust purification catalyst 13. The temperature elevation control operations of the particulate filter 14 and the exhaust purification catalyst 13 are performed under an excess of oxygen, that is, under a lean air-fuel ratio, by periodically injecting hydrocarbons from the hydrocarbon feed valve 15.

In this regard, the time until a temporary drop in the air-fuel ratio of the exhaust gas flowing into the exhaust purification catalyst 13 is first caused due to the injection of hydrocarbons after the injection of hydrocarbons, that is, the period by which a temporary drop in air-fuel ratio of the inflowing exhaust gas is caused, can be calculated from the time which is required for recirculation of the exhaust gas. That is, the time which is required for recirculation of exhaust gas becomes the sum of the time TA during which the EGR gas containing the carbon dioxide $CO_2$ which flows out from the exhaust purification catalyst 13 flows within the EGR passage 23 of the low pressure exhaust gas recirculation system LPL and the time TB until the intake air containing this EGR gas passes through the intake passages 6$a$, 6$b$ and combustion chamber 2 and flows into the exhaust purification catalyst 13. In this case, the time TA can be calculated by dividing the volume of the EGR gas flow passage up to where the exhaust gas flowing out from the exhaust purification catalyst 13, that is, the EGR gas, reaches the intake passage 6$a$ by the amount of EGR. On the other hand, the time TB can be calculated by dividing the volume of the gas flow passage up to where the intake air containing the EGR gas reaches the exhaust purification catalyst 13 by the (intake air amount+EGR amount).

On the other hand, in an internal combustion engine, the EGR rate GR (=EGR gas amount/(intake gas amount+EGR gas amount)) is normally set in advance in accordance with the operating state of the engine. In an embodiment according to the present invention, this EGR rate GR is stored as a function of the amount of inject ion Q from the fuel injector 3 and the engine speed N in the form of a map such as shown in FIG. 20A in advance in the ROM 32. Therefore, if the operating state of the engine is determined, the EGR rate GR becomes determined. On the other hand, the intake air amount is continuously measured. Further, the volume of the above-mentioned EGR gas flow passage and the volume of the gas flow passage are found in advance. Therefore, the time (TA+TB) which is required for recirculation of the exhaust gas can be calculated from the EGR rate and the intake air amount. Incidentally, in the example which is shown in FIG. 19, the injection period $\Delta T$ of the hydrocarbons from the hydrocarbon feed valve 15 is made 1.5 times the time (TA+TB) which is required for recirculation of the exhaust gas.

That is, in an embodiment according to the present invention, when hydrocarbons are periodically injected from the hydrocarbon feed valve 15 for temperature elevation control of at least one of the particulate filter 14 and the exhaust purification catalyst 13, the injection timing of hydrocarbons when the next injection action of hydrocarbons from the hydrocarbon feed valve 15 is performed after the injection of hydrocarbons is calculated from the recirculation rate GR of the exhaust gas and the intake air amount. Further, the injection time WTX of the hydrocarbons which is required for making the temperature of the particulate filter 14 or the exhaust purification catalyst 13 rise to the target temperature, for example, 600° C. is stored as a function of the amount of injection Q from the fuel injector 3 and the engine speed N in the form of the map such as shown in FIG. 20B in advance in the ROM 32.

Next, referring to FIG. 21 to FIG. 24, an $NO_X$ removal method when making the exhaust purification catalyst 13 function as an $NO_X$ storage catalyst will be explained specifically. The $NO_X$ removal method in the case of making the exhaust purification, catalyst 13 function as an $NO_X$ storage catalyst in this way will be referred to below as the "second $NO_X$ removal method".

Figure 21:
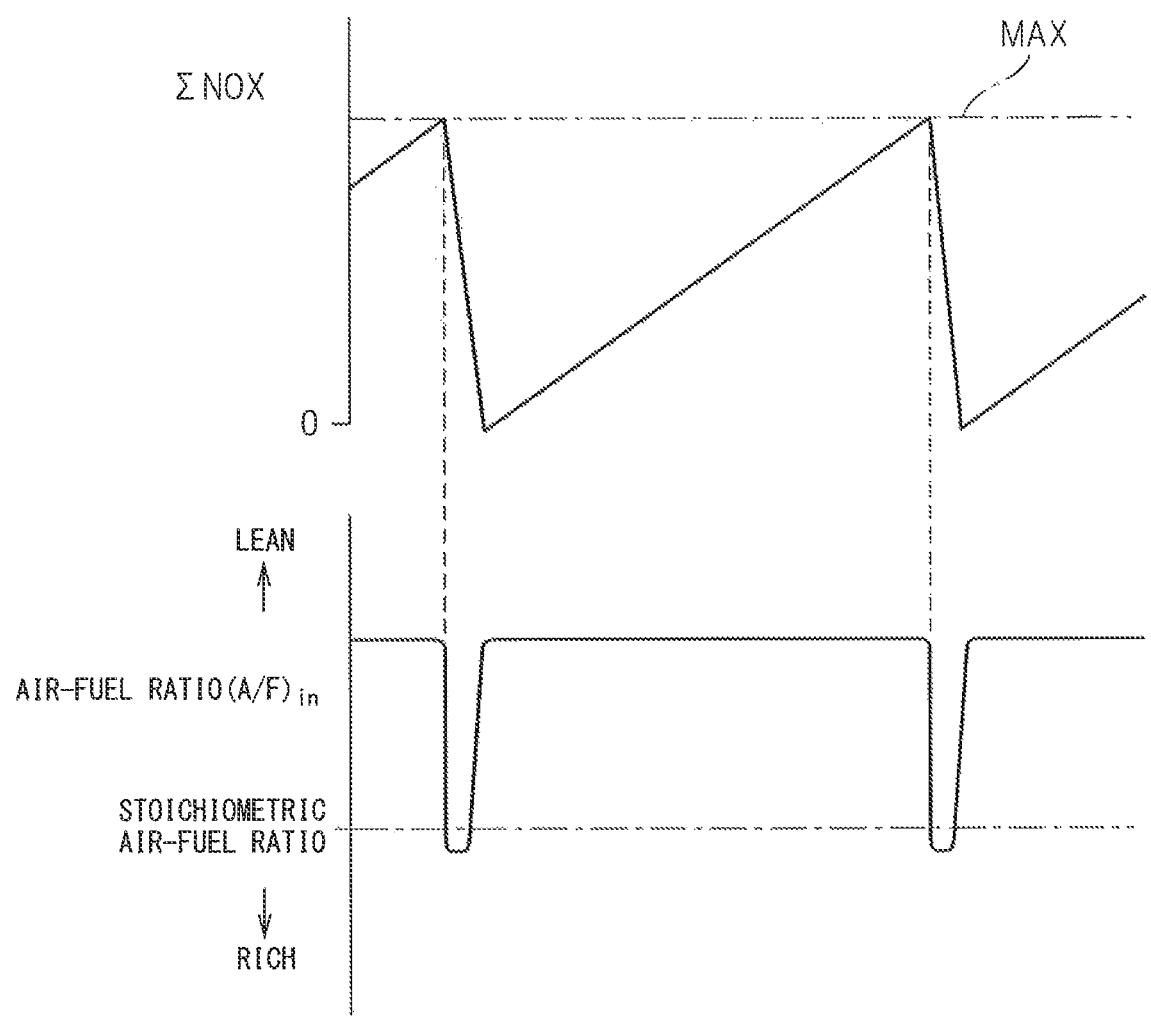
FIG. 21 is a view which shows $NO_X$ release control.

In this second $NO_X$ removal method, as shown in FIG. 21, when the stored $NO_X$ amount $\Sigma NO_X$ of $NO_X$ which is stored in the basic layer 53 exceeds a predetermined allowable amount MAX, the air-fuel ratio (A/F)in of the exhaust gas flowing into the exhaust purification catalyst 13 is temporarily made rich. If the air-fuel ratio (A/F)in of she exhaust gas is made rich, the $NO_X$ which was stored in the basic layer 53 when the air-fuel ratio (A/F)in of the exhaust gas was lean is released from the basic, layer 53 ail at once and reduced. Due to this, the $NO_X$ is removed.

Figure 22:
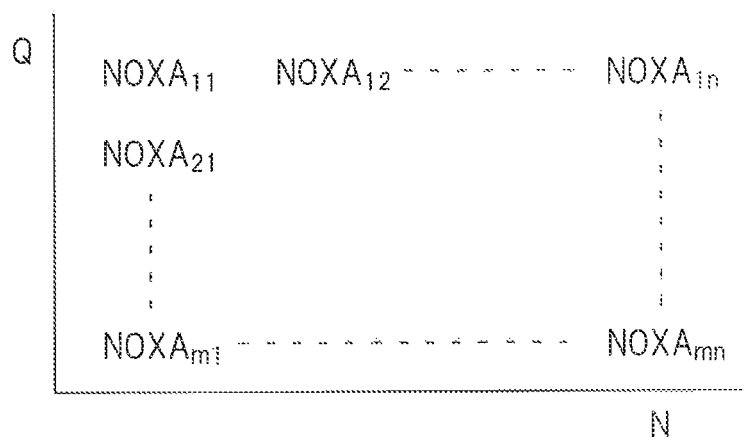
FIG. 22 is a view which shows a map of an exhausted $NO_X$ amount NOXA.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the injection amount Q and engine speed N in the form of a map such as shown in FIG. 22 in advance in the ROM 32. The stored $NO_X$ amount $\Sigma NO_X$ is calculated from the exhausted $NO_X$ amount NOXA. In this case, as explained before, the period during which the air-fuel ratio (A/F)in of the exhaust gas is made rich is usually 1 minute or more.

Figure 23:
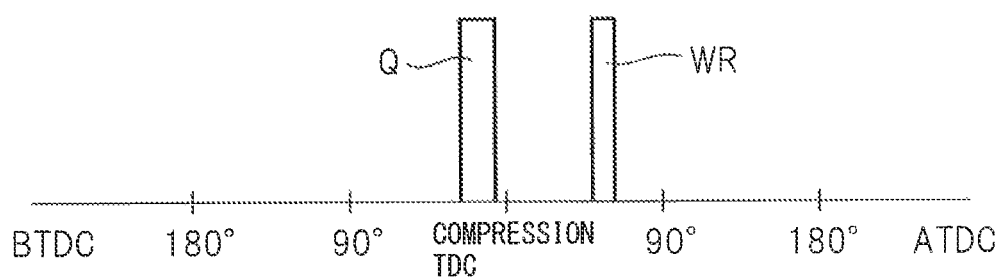
FIG. 23 is a view which shows a fuel injection timing.
Figure 24:
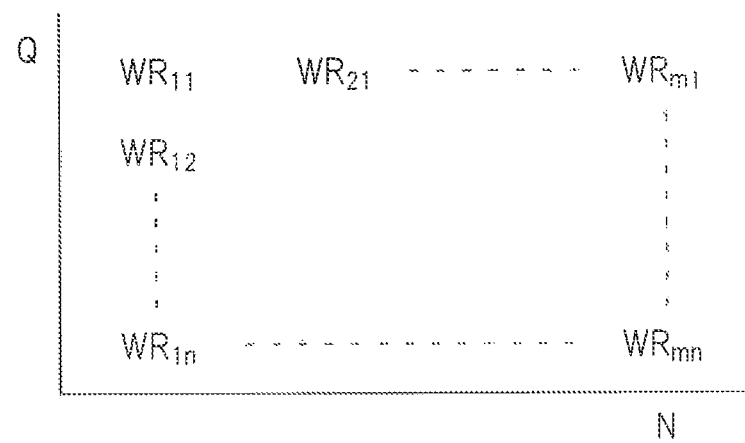
FIG. 24 is a view which shows a map of an additional fuel amount WR.

In this second $NO_X$ removal method, as shown in FIG. 23, in each combustion chamber 2, the fuel injector 3 injects additional fuel WR in addition to the combustion-use fuel Q so that the air-fuel ratio (A/F)in of the exhaust gas which flows into the exhaust purification catalyst 13 is made rich. Note that, in FIG. 23, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 24 in advance in the ROM 32. Of course, in this case, it is also possible to make the injection amount of hydrocarbons from the hydrocarbon feed valve 15 increase so as to make the air-fuel ratio (A/F)in of the exhaust gas rich.

Now, the temperature of the exhaust gas which flows out from the exhaust purification catalyst 13 and the particulate filter 14 to the inside of the exhaust pipe 12b is considerably lower than the temperature of the exhaust gas which is exhausted to the inside of the exhaust manifold 5, therefore, the temperature of the exhaust gas which is recirculated by the low pressure exhaust gas recirculation system LPL to the inside of the combustion chambers 2 becomes considerably lower than the temperature of the exhaust gas which is recirculated by the high pressure exhaust gas recirculation system HPL to the inside of the combustion chambers 2. Therefore, use of the low pressure exhaust gas recirculation system LPL to recirculate exhaust gas, compared with use of the nigh pressure exhaust gas recirculation system HPL to recirculate exhaust gas, results in the combustion temperature in the combustion chambers 2 falling and the amount of production of $NO_X$ in the combustion chambers 2 falling. That is, using the low pressure exhaust gas recirculation system LPL to recirculate the exhaust gas, compared with using the high pressure exhaust gas recirculation system HPL to recirculate the exhaust gas, enables a reduction of the amount of $NO_X$ which is exhausted from the combustion chambers 2.

Therefore, in this embodiment according to the present invention, usually the low pressure exhaust gas recirculation system LPL is used for the recirculation action of exhaust gas. Only when use of the high pressure exhaust gas recirculation system HPL would be preferable over use of the low pressure exhaust gas recirculation system LPL is the high pressure exhaust gas recirculation system HPL used.

On the other hand, if comparing the $NO_X$ purification rate when using the first $NO_X$ removal method and the $NO_X$ purification rate when using the second $NO_X$ removal method, using the first $NO_X$ removal method enables a higher $NO_X$ purification rate to be obtained. On the other hand, the frequency of feed of hydrocarbons in the case of use of the first $NO_X$ removal method is considerably higher than the frequency of feed of hydrocarbons in the case of use of the second $NO_X$ removal method, so the amount of hydrocarbons which are consumed for removal of $NO_X$ becomes greater in the case of use of the first $NO_X$ removal method compared with the case of use of the second $NO_X$ removal method. That is, if viewed from the $NO_X$ purification rate, use of the first $NO_X$ removal method is preferable, but if viewed from the standpoint of the reduction of the amount of consumption of hydrocarbons, it can be said that use of the second $NO_X$ removal method is preferable.

Figure 25:
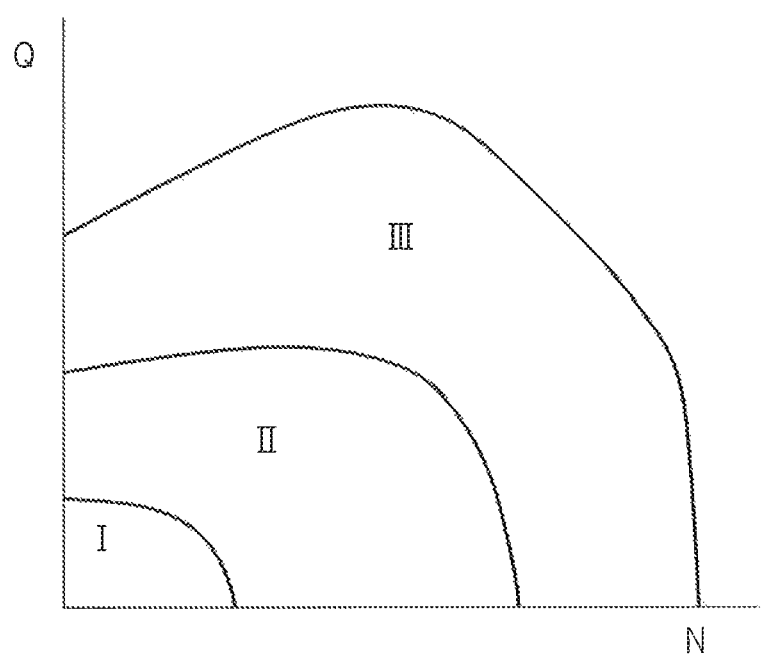
FIG. 25 is a view which shows operating regions I, II, and III.

If considering these facts, whether the low pressure exhaust gas recirculation system LPL is used or the high pressure exhaust gas recirculation system HPL is used determines whether the first $NO_X$ removal method is used or the second $NO_X$ removal method is used. In this embodiment according to the present invention, as shown in FIG. 25, the operating region of the engine is divided into three operating regions I, II, and III according to the fuel injection amount Q from the fuel injectors 3 and the engine speed N. At the time of steady operation, which of the low pressure exhaust gas recirculation system LPL and the high pressure exhaust gas recirculation system HPL is used and which of the first $NO_X$ removal method and the second $NO_X$ removal method is used are determined in advance for the operating regions I, II, and III.

In FIG. 25, the operating region. II expresses the medium speed, medium load operating region which is used frequently at the time of steady operation. At the time of steady operation, in this operating region II, as the exhaust gas recirculation system, the low pressure exhaust gas recirculation system LPL is used, while as the $NO_X$ removal method, the second $NO_X$ removal method is used. That is, in the operating region II, the low pressure exhaust, gas recirculation system LPL is used so as to reduce the amount of exhaust of $NO_X$ from the combustion chambers 2 and the second $NO_X$ removal method is used so as to reduce the amount of consumption of hydrocarbons.

On the other hand, in FIG. 25, the operating region III expresses the high speed, high load operating region. At the time of steady operation, in this operating region III, as the exhaust gas recirculation system, the low pressure exhaust gas recirculation system LPL is used, while as the $NO_X$ removal, method, the first $NO_X$ removal method is used. That is, at the time of high speed, high load operation, the amount, of exhaust of $NO_X$ from the combustion chambers 2 increases. Therefore, at this time, the low pressure exhaust gas recirculation system LPL is used, so as to reduce the amount of exhaust of $NO_X$ from, the combustion chambers 2 as much as possible and the first $NO_X$ removal method is used so as to obtain a high $NO_X$ purification rate.

On the other hand, in FIG. 25, the operating region I expresses the low speed, low load operating region. In this operating region I, as the exhaust gas recirculation system, the nigh pressure exhaust gas recirculation system HPL is used, while as the $NO_X$ removal method, the second $NO_X$ removal method is used. That is, at the time of low speed, low load operation, the temperature of the exhaust gas which is exhausted from the combustion chambers 2 is low. If at this time using the low pressure exhaust gas recirculation system LPL to recirculate the exhaust gas, the moisture which is contained in the exhaust gas will condense inside of the cooling device 25. As a result, the problem will arise of moisture ending up building up inside of the low pressure exhaust gas recirculation system LPL. To prevent such a problem from occurring, in the operating region I, the high pressure exhaust gas recirculation system. HPL is used, while the second $NO_X$ removal method is used to reduce the amount of consumption of hydrocarbons.

Figure 26:
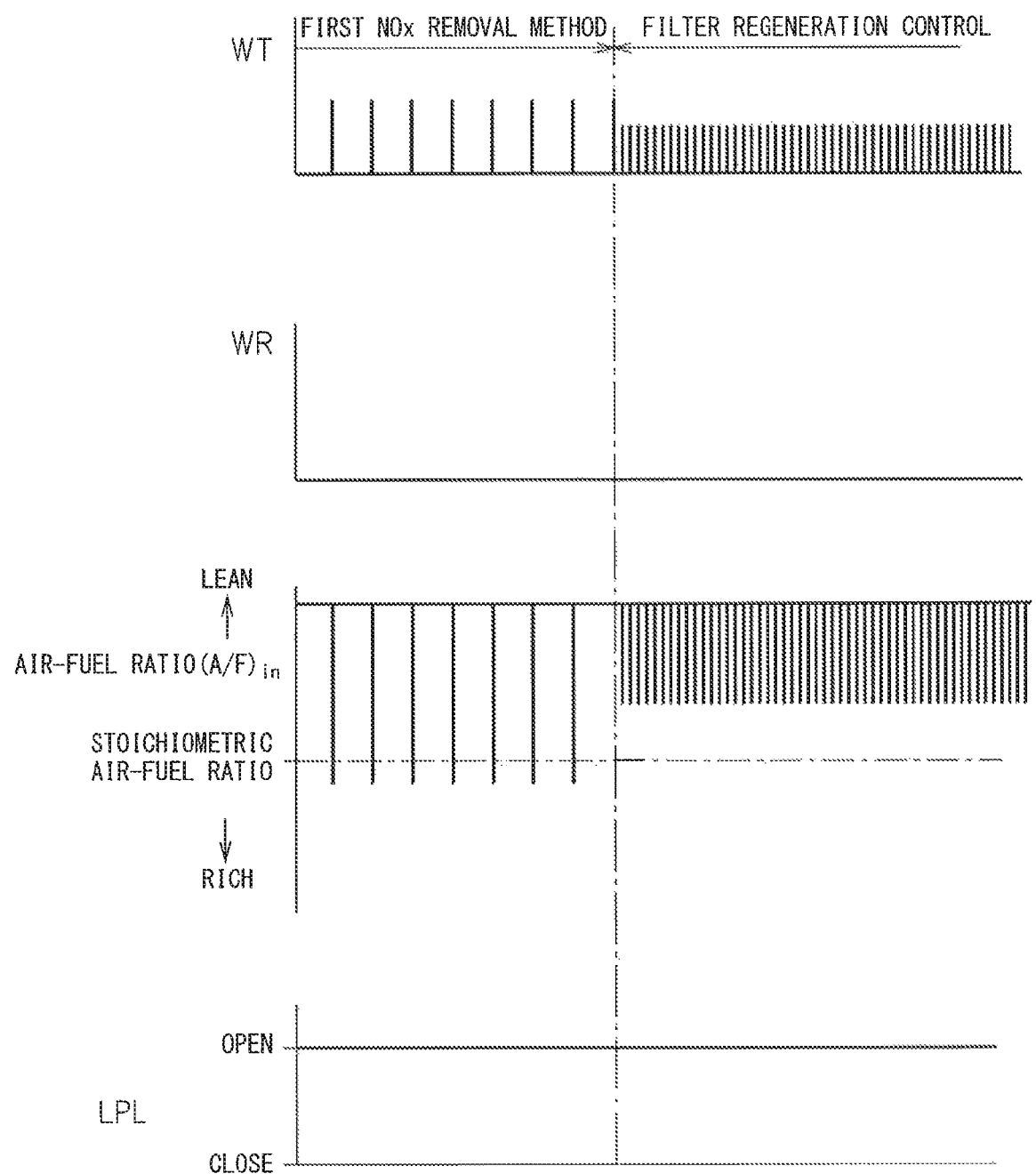
FIG. 26 is a view which shows a first $NO_X$ purification method and a regeneration control of particulate filter.
Figure 27:
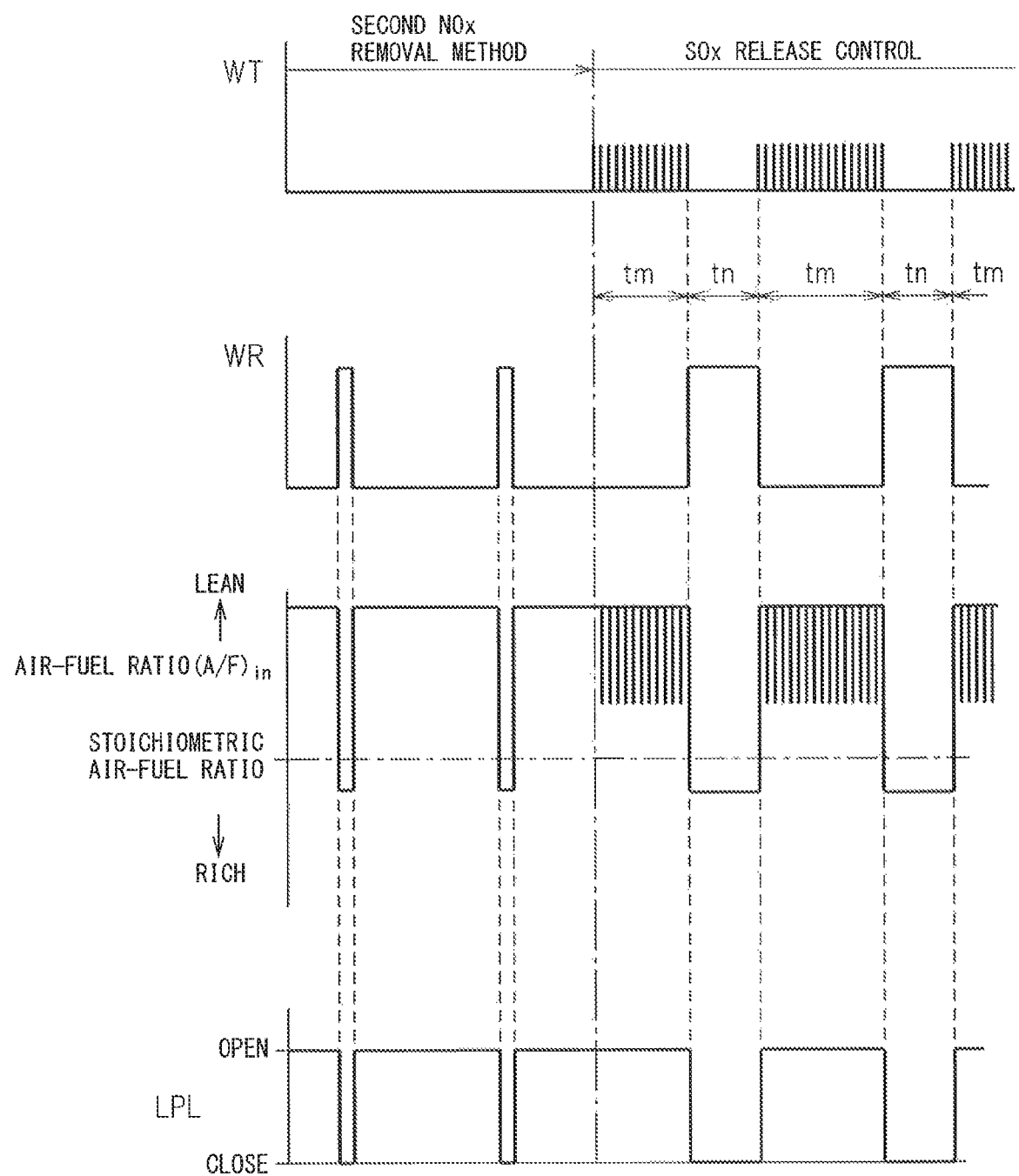
FIG. 27 is a view which shows a second $NO_X$ purification method and a $SO_X$ release control.

FIG. 26 shows the injection time WT of the hydrocarbon feed valve 15, the amount of additional injected fuel WR from the fuel injector 3, the air-fuel ratio (A/F)in of the exhaust gas flowing into the exhaust purification catalyst 13, and the operating state of the EGR control valve 24 of the low pressure exhaust gas recirculation system LPL when the action of removal of $NO_x$ by the first $NO_x$ removal method is performed and when the regeneration control of the particulate filter 14 is performed, while FIG. 27 shows the injection time WT of the hydrocarbon feed valve 15, the amount of additional injected fuel from the fuel injector 3, the air-fuel ratio (A/F)in of the exhaust gas flowing into the exhaust purification catalyst 13, and the operating state of the EGR control, valve 24 of the low pressure exhaust gas recirculation system LPL when the action of removal of $NO_x$ by the second $NO_x$ removal method is performed and when the control for release of $SO_x$ from the exhaust purification catalyst 13 is performed.

As shown in FIG. 26, when regeneration control of the particulate filter 14 is being performed, compared with when the action of removal of $NO_x$ by the first $NO_x$ removal method is being performed, the injection time WT of the hydrocarbon feed valve 15 is made shorter. At this time, the injection action of hydrocarbons from the hydrocarbon feed valve 15 is performed while maintaining the air-fuel ratio (A/F)in of the exhaust gas flowing into the exhaust purification catalyst 13 lean. Note that, when the first $NO_x$ removal method and regeneration control of the particulate filter 14 are performed, the EGR control valve 24 of the low pressure exhaust gas recirculation system LPL is made to open.

On the other hand, as shown in FIG. 27, when control for release of $SO_x$ from the exhaust purification catalyst 13 is being performed, temperature elevation control of the exhaust purification catalyst 13 or temperature maintenance control which maintains the temperature or the exhaust purification catalyst 13 at 600° C. or so which is shown by tm, or rich control which releases $SO_x$ from the exhaust purification catalyst 13 by injecting additional fuel WR from the fuel injector 3 to make the air-fuel ratio (A/F)in of the exhaust gas flowing into the exhaust purification catalyst 13 rich, which is shown by tn, are alternately repeated. When performing temperature elevation control of the exhaust purification catalyst 13 or temperature maintenance control which maintains the temperature of the exhaust purification catalyst 13 at 600° C. or so, which is shown by tm, in the same way as when the regeneration control of the particulate filter 14 which is shown in FIG. 26 is performed, the injection action of hydrocarbons from the hydrocarbon feed valve 15 is performed while maintaining the air-fuel ratio (A/F)in of the exhaust gas flowing into the exhaust purification catalyst 13 lean. At this time, the EGR control valve 24 of the low pressure exhaust gas recirculation system LPL is made to open.

On the other hand, when rich control which is shown by tn is performed in a state that the control for release of $SO_x$ from the exhaust purification catalyst 13 is being performed, the EGR control valve 24 of the low pressure exhaust gas recirculation system. LPL is made to close to prevent fluctuation of the generated torque of the engine. In this way, in this embodiment of the present invention, when $SO_x$ should be released from the exhaust purification catalyst 13, rich control for making the air-fuel ratio of the inflowing exhaust gas into the exhaust purification catalyst 13 temporarily rich and temperature elevation control for releasing $SO_{xx}$ from the exhaust purification catalyst 13 are alternately performed, and when rich control is being performed, the exhaust gas recirculation action by the low pressure exhaust gas recirculation system LPL is suspended. Further, when the action of removal of $NO_x$ by the second $NO_x$ removal method is being performed, usually the EGR control valve 24 of the low pressure exhaust gas recirculation system LPL is made to open, while when the air-fuel ratio of the exhaust gas which flows into the exhaust reunification catalyst 13 is made temporarily rich for releasing $NO_x$ from the exhaust purification catalyst 13, the EGR control valve 24 of the low pressure exhaust gas recirculation system LPL is made to close to prevent fluctuation of the generated torque of the engine.

In this regard, as explained above, if hydrocarbons are injected from the hydrocarbon feed valve 15, the majority of the hydrocarbons is oxidized at the exhaust purification catalyst 13 and, as a result, a large amount of carbon dioxide $CO_2$ are generated in the exhaust purification catalyst 13. At this time, part of the hydrocarbons which is injected from the hydrocarbon feed valve 15 sometimes slips through the exhaust purification catalyst 13. At this time, not only carbon dioxide $CO_2$, but also hydrocarbons are exhausted from the exhaust purification catalyst 13. On the other hand, at this time, if exhaust gas recirculation action by the low pressure exhaust gas recirculation system LPL is performed, the hydrocarbons which are exhausted from the exhaust purification catalyst 13 flow into the cooling system 25.

In this case, if the amount of hydrocarbons which flow into the cooling system 25 is small, no particularly great problem occurs. However, if the amount of hydrocarbons which flows into the cooling system 25 is large, the hydrocarbons which flow into the cooling system 25 are cooled in the cooling system 25 and condensed. As a result, the hydrocarbons stick as deposits to the inside of the cooling system 25. In this way, if hydrocarbons stick to the inside of the cooling system 24 as a deposit, the cooling efficiency of the cooling system 25 deteriorates and, as a result, a drop in the performance of the cooling system 25 is caused. Therefore, when the low pressure exhaust gas recirculation system LPL is being used to perform exhaust gas recirculation action, it is necessary to prevent the large amount of hydrocarbons which slip through the exhaust purification catalyst 13 from flowing into the cooling system 25.

Now then, the amount of hydrocarbons which slip through the exhaust purification catalyst 13 increases when the amount of injection of hydrocarbons from the hydrocarbon feed valve 15 is large and the hydrocarbons which are injected from the hydrocarbon feed valve 15 are not sufficiently oxidized at the exhaust purification catalyst 13. In this case, if the exhaust purification catalyst 13 becomes lower in catalyst temperature TC, the exhaust purification catalyst 13 falls in oxidation ability, so hydrocarbons are not sufficiently oxidized. Further, if the flow rate of exhaust gas becomes fast, the reaction time between the oxygen and hydrocarbons on the exhaust purification catalyst 13 will become shorter, so the oxidation action on the hydrocarbons will weaken and therefore the hydrocarbons will no longer be sufficiently oxidized. Therefore, the amount of hydrocarbons which slip through the exhaust purification catalyst 13 increases when the amount of injection of hydrocarbons from the hydrocarbon feed valve 15 is large and further the catalyst temperature TC of the exhaust purification catalyst 13 is low and when the flow rate of the exhaust gas is fast, that is, when the intake air amount is large.

In this regard, the amount of injection of hydrocarbons from the hydrocarbon feed valve 15 is large and, further, in the state of such a large amount of injection of hydrocarbons, the catalyst temperature TC of the exhaust purification catalyst 13 can become low and the amount of intake air can become greater when the $NO_x$ removal action by the first $NO_x$ removal method is performed. That is, when the $NO_x$ removal action by the first $NO_x$ removal method is performed, if the catalyst temperature TO of the exhaust purification catalyst 13 becomes low and the intake air amount becomes large, a large amount of hydrocarbons will slip through the exhaust purification catalyst 13. If, at this time, the exhaust gas recirculation action by the low pressure exhaust gas recirculation system LPL is performed, a large amount of hydrocarbons will flow into the cooling system 25. In this case, if the amount of hydrocarbons which flow into the cooling system 25 exceeds the allowable amount, the cooling system 25 will deteriorate in cooling efficiency and, as a result, a drop in the performance of the cooling system 25 will be caused.

Figure 28A:
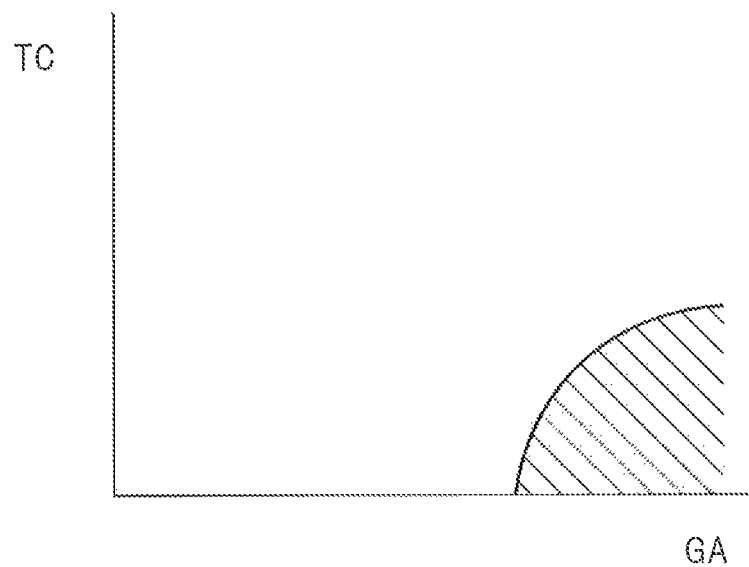

The region of a large amount of slipthrough of HC where the amount of hydrocarbons flowing into the cooling system 25 exceeds the allowable amount is shown in FIG. 28A by the hatching. That is, if, as in the region shown in FIG. 23A by the hatching, the catalyst temperature TC of the exhaust purification catalyst 13 becomes row and the intake air amount GA becomes large, a large amount of hydrocarbons slip through the exhaust purification catalyst 13 and, as a result, the amount of hydrocarbons which flow into the cooling system 25 ends up exceeding the allowable amount. Therefore, in an embodiment according to the present invention, when the exhaust gas recirculation action by the low pressure exhaust gas recirculation system LPL is performed and further the $NO_x$ removal action by the first $NO_x$ removal method is performed, if the catalyst temperature TC of the exhaust purification catalyst 13 and intake air amount GA become the region of a large amount of slipthrough of HC shown in FIG. 28A by the hatching, the flow pass switching valve 26 is switched so that the inlet of the cooling system 25 is closed and the inlet of the bypass passage 25a is opened. That is, in an embodiment according to the present invention, when the amount of hydrocarbons which flows into the exhaust gas recirculation passage LPL exceeds a predetermined allowable amount, the flow pass switching valve 26 is switched so that the exhaust gas does not flow into the cooling system 25, but flows into the bypass passage 25a.

Figure 28B:
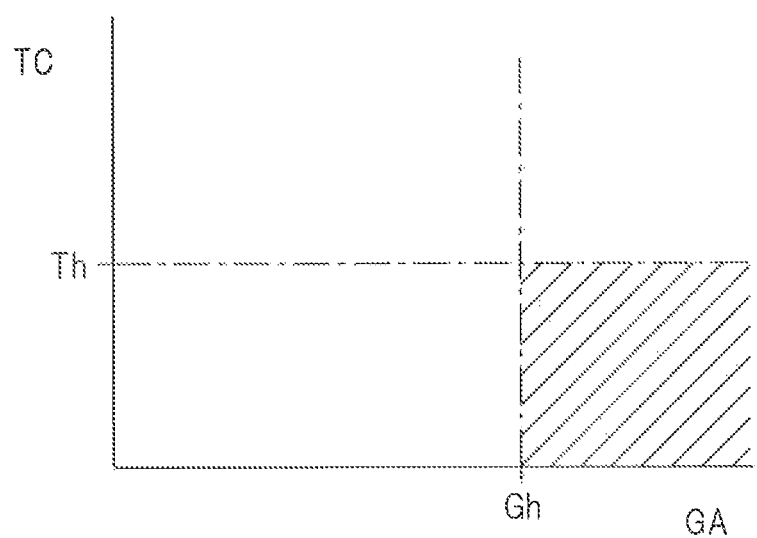

Note that, the region shown by the hatching in FIG. 28A of the large amount of slipthrough of HC is found in advance by experiments. This region of the large amount of slipthrough of HC is stored in advance in the ROM 32. Note that, in this case, as shown in FIG. 28B by the hatching, the region where the catalyst temperature TC of the exhaust purification catalyst 13 is lower than the predetermined temperature Th and the intake air amount GA is larger than the predetermined amount Gh can also be made the region of the large amount of slipthrough of HC.

Figure 29:
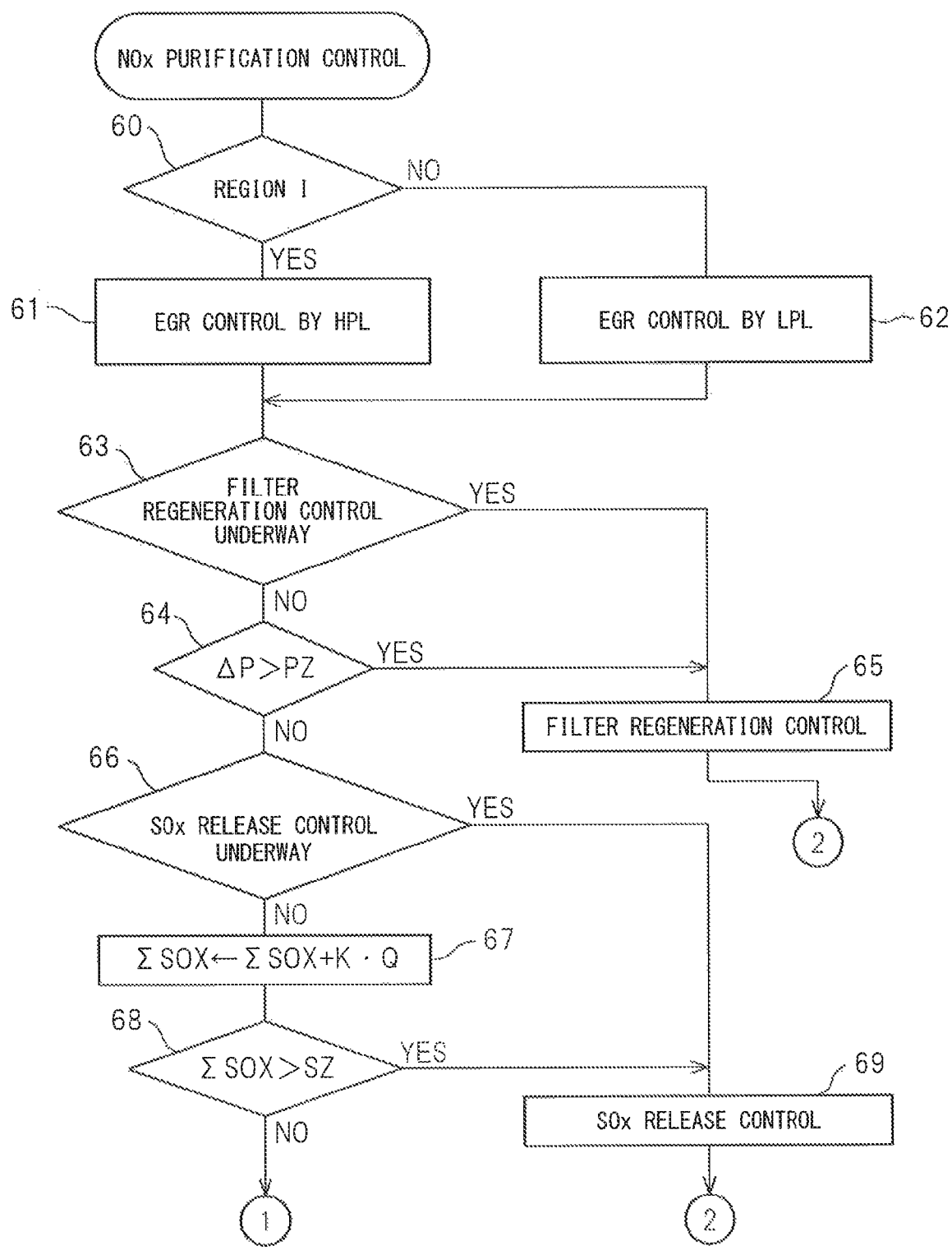
FIG. 29 is a flow chart for $NO_X$ purification control.
Figure 30:
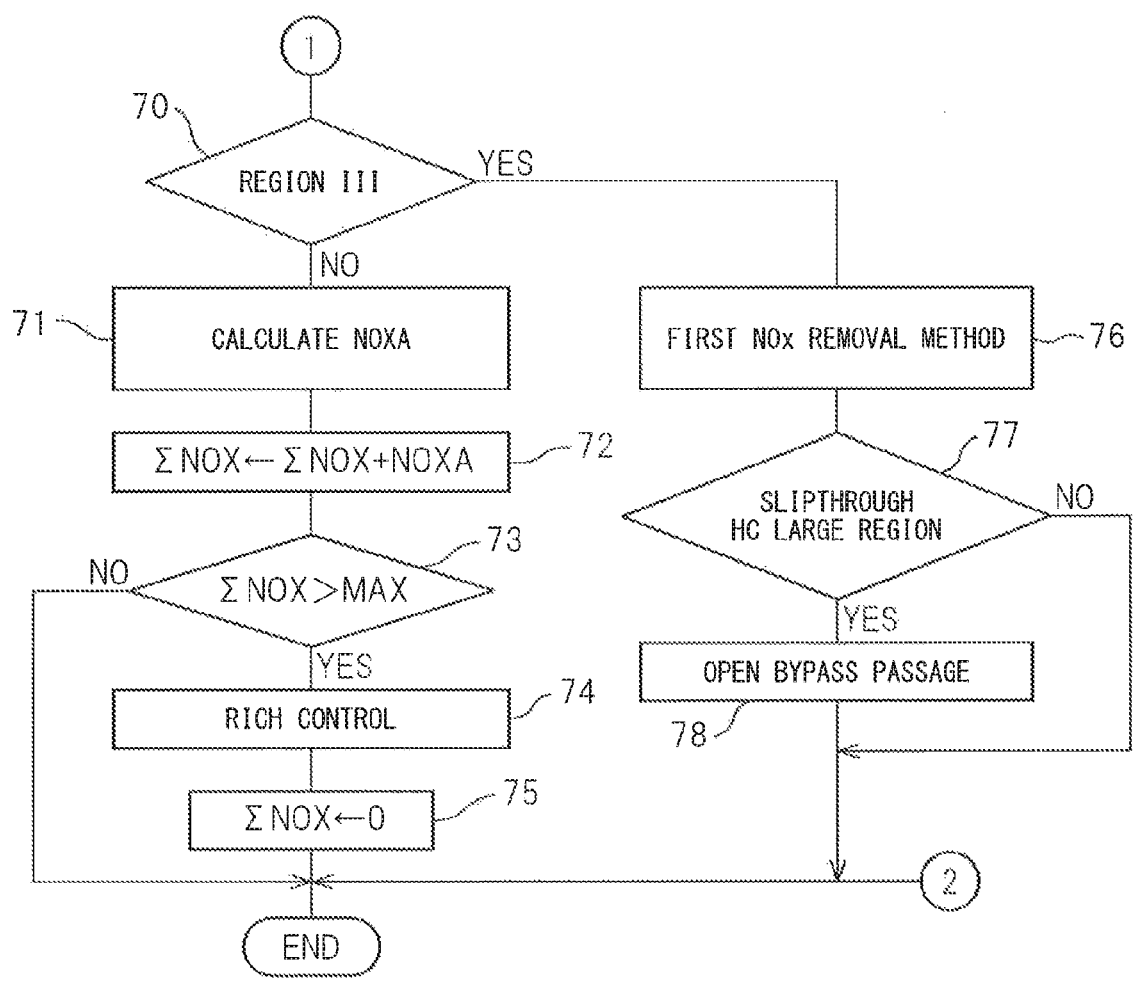
FIG. 30 is a flow chart for $NO_X$ purification control.

FIG. 29 and FIG. 30 show an $NO_x$ purification control routine. This routine is executed by interruption every fixed time. Referring to FIG. 29, first, at step 60, it is judged if the operating state of the engine is in the operating region I which is shown in FIG. 25. When the operating state of the engine is in the operating region I, the routine proceeds to step 61 where the exhaust gas recirculation action by the high pressure exhaust gas recirculation system HPL is performed, next, the routine proceeds to step 63. As opposed to this, when the operating state of the engine is not in the operating region I, the routine proceeds to step 62 where the exhaust gas recirculation action by the low pressure exhaust gas recirculation system LPL is performed, next, the routine proceeds to step 63.

At step 63, it is judged if regeneration control of the particulate filter 14 is underway. When regeneration control of the particulate filter 14 is not underway, the routine proceeds to step 64 where it is judged if the differential pressure ΔP before and after the particulate filter 14 which is detected by the differential pressure sensor 28 exceeds the allowable value PZ. When the differential pressure ΔP before and after the particulate filter 14 does not exceed the allowable value PZ, the routine proceeds to step 66 where it is judged if the control for release of $SO_x$ from the exhaust purification catalyst 13 is underway. If control for release of $SO_x$ from the exhaust purification catalyst 13 is not underway, the routine proceeds to step 67 where the $SO_x$ amount ΣSOX which is stored in the exhaust purification catalyst 13 is calculated. The fuel which is injected from the fuel injector 3 contains sulfur in a certain ratio. Therefore, at step 67, the $SO_x$ amount ΣSOX which is stored in the exhaust purification catalyst 13 is calculated by cumulatively adding a value which is obtained by multiplying the amount of fuel injection Q from the fuel injector 3 with the constant K. Next, the routine proceeds to step 68.

At step 68, it is judged if the stored $SO_x$ amount ΣSOX exceeds the allowable $SO_x$ amount SZ. When the stored $SO_x$ amount ΣSOX does not exceed the allowable $SO_x$ amount SZ, the routine proceeds to step 70 where it is judged if the operating state of the engine is in the high speed high load operating region III which is shown in FIG. 25. When the operating state of the engine is not in the high speed high load operating region III which is shown in FIG. 25, the routine proceeds to step 71 where the $NO_x$ removal action by the second $NO_x$ removal method is performed.

That is, at step 71, the $NO_x$ amount NOXA which is exhausted per unit time is calculated from the map which is shown in FIG. 22. Next, at step 72, the stored $NO_x$ amount ΣNOX is calculated by adding the exhausted $NO_x$ amount NOXA to ΣNOX. Next, at step 73, it is judged if the stored $NO_x$ amount ΣNOX exceeds the allowable value MAX. When ΣNOX>MAX, the routine proceeds to step 74 where rich control which makes the air-fuel ratio of the exhaust gas flowing into the exhaust purification catalyst 13 temporarily rich for releasing $NO_x$ from the exhaust purification catalyst 13 is performed. In this rich control, the additional amount of fuel WR is calculated, from the map which is shown in FIG. 24 and an injection action of additional fuel is performed. Furthermore, at this time, the EGR control valve 24 of the low pressure exhaust gas recirculation system LPL is made to close. Next, at step 75, ΣNOX is cleared.

As opposed to this, when it is judged at step 70 that the operating state of the engine is the high speed high, load operating region III which is shown in FIG. 25, the routine proceeds to step 75 where the $NO_x$ removal action by the first $NO_x$ removal method is performed based on the injection time WT of hydrocarbons calculated from the map shown, in FIG. 16A and the injection period ΔT of the hydrocarbons calculated from the map shown in FIG. 16B. Next, at step 77, it is judged if the catalyst temperature TC of the exhaust purification catalyst 13 and the intake air amount GA are in the region shown by the hatching of FIG. 28A of a large amount of slipthrough of HC. When the catalyst temperature TC of the exhaust, purification catalyst 13 and the intake air amount GA are not in the region shown by the hatching of FIG. 28A of a large amount of slipthrough of HC, the processing cycle is ended. At this time, due to the flow pass switching valve 26, the inlet of the cooling system 25 is opened and the inlet of the bypass passage 25a is closed. Therefore, at this time, exhaust gas is sent into the cooling system 25.

As opposed to this, when it was judged at step 77 that, the catalyst temperature TC of the exhaust purification catalyst 13 and the intake air amount GA are in the region of the large amount of slipthrough which, is shown by the hatching in FIG. 28A, the routine proceeds to step 78 where the flow pass switching valve 26 is switched so that the inlet of the cooling system 25 is closed and the inlet, of the bypass passage 25a is opened. Therefore, at this time, the exhaust gas does not flow into the cooling system 25, but flows into the bypass passage 25a.

On the other hand, when it is judged at step 64 that the differential pressure ΔP before and after the particulate filter 14 exceeds the allowable value PZ, the routine proceeds to step 65 where regeneration control of the particulate filter 14 is performed. If regeneration control of the particulate filter 14 is started, at step 63, it is judged that regeneration control of the particulate filter 14 is underway and the routine proceeds to step 65. The regeneration control routine of the particulate filter 14 at this step 65 is shown in FIG. 31.

Figure 31:
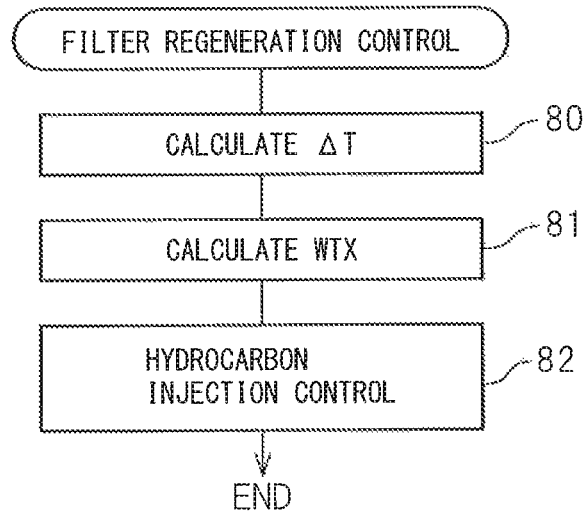
FIG. 31 is a flow chart for regeneration control of particulate filter.

In this particulate filter regeneration control routine, as shown in FIG. 31, first, at step 80, the injection period ΔT of the hydrocarbons from the hydrocarbon feed valve 15 is calculated from the EGR rate GR shown in FIG. 20A and the intake air amount. As explained above, in the example which is shown in FIG. 19, the injection period ΔT of the hydrocarbons from the hydrocarbon feed valve 15 is made 1.5 times the time (TA+TB) which is required for recirculation of the exhaust gas. Next, at step 81, the injection time WTX of the hydrocarbons which is required for raising the temperature of the particulate filter 14 to the target temperature, for example, 600° C., is calculated from the map shown in FIG. 20B. Next, at step 82, injection control of the hydrocarbons is performed based on the injection period ΔT of the hydrocarbons which was calculated at step 80 and the injection time WTX of the hydrocarbons which was calculated at step 81.

On the other hand, when it is judged at step 68 of FIG. 29 that the stored $SO_x$ amount ΣSOX exceeds the allowable $SO_x$ amount SZ, the routine proceeds to step 69 where control for release of $SO_x$ from the exhaust purification catalyst 13 is performed. If control for release of $SO_x$ from the exhaust purification catalyst 13 is started, at step 66, it is judged that control for release of $SO_x$ from the exhaust purification catalyst 13 is underway and the routine proceeds to step 69. The routine for control for release of $SO_x$ from the exhaust purification catalyst 13 at step 63 is shown in FIG. 32.

Figure 32:
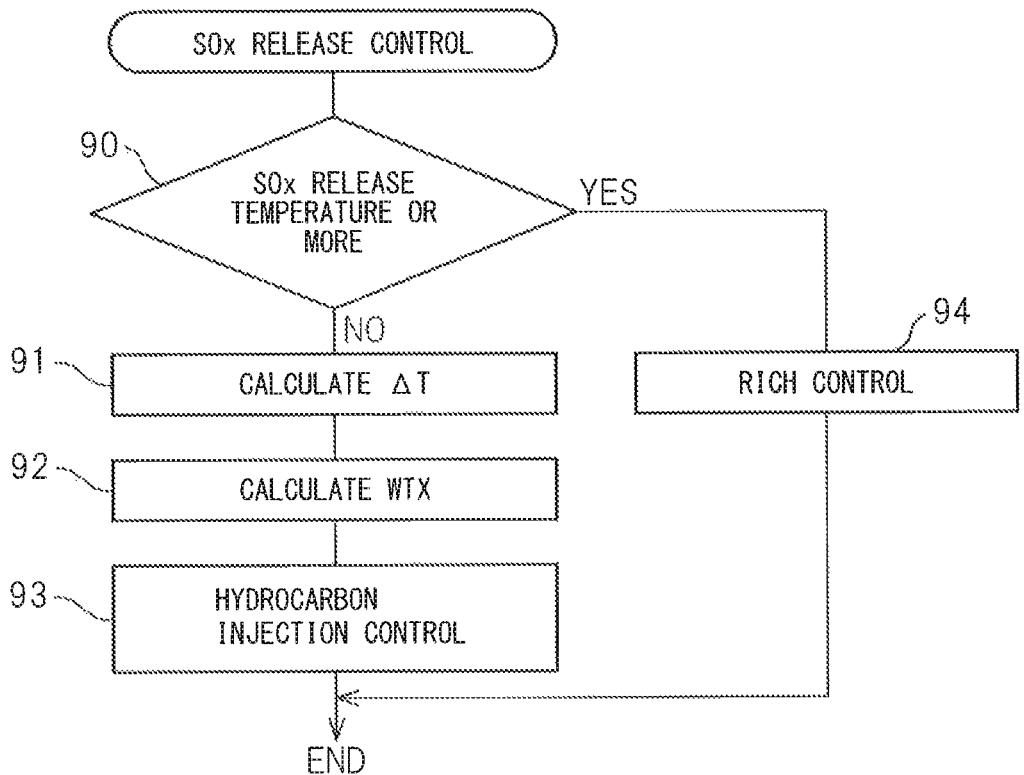
FIG. 32 is a flow chart for $SO_X$ release control.

In the $SO_x$ release control routine from this exhaust purification catalyst 13, as shown in FIG. 32, first, at step 90, it is judged if the temperature of the exhaust purification catalyst 13 is more than the $SO_x$ release temperature at which the exhaust purification catalyst 13 can release $SO_x$, for example, 600° C. When the temperature of the exhaust purification catalyst 13 is not the $SO_x$ release temperature or more, the routine proceeds to step 91 where the injection period ΔT of the hydrocarbons from the hydrocarbon feed valve 15 is calculated from the EGR rate GR shown in FIG. 20A and the intake air amount. In this case as well, in the example which is shown in FIG. 13, the injection period ΔT of the hydrocarbons from, this hydrocarbon feed valve 15 is made 1.5 times the time (TA+TB) which is required for recirculation of exhaust gas. Next, at step 92, the injection time WTX of the hydrocarbons required for raising the exhaust purification catalyst 13 to the target temperature, for example, 600° C., is calculated from, the map which is shown in FIG. 20B. Next, at step 93, injection control of the hydrocarbons is performed based on the injection period ΔT of the hydrocarbons which was calculated at step 91 and the injection time WTX of the hydrocarbons which was calculated at step 92.

On the other hand, when it is judged at step 90 that the temperature of the exhaust purification catalyst 13 is the $SO_x$ release temperature or more, the routine proceeds to step 94 where rich control which makes the air-fuel ratio of the exhaust gas flowing into the exhaust purification catalyst 13 temporarily rich for releasing $SO_x$ from the exhaust purification catalyst 13 is performed. In this rich control, the amount of additional fuel WR is calculated from the map which is shown in FIG. 24 and an injection action of additional fuel is performed. Furthermore, at this time, the EGR control valve 24 of the low pressure exhaust gas recirculation system LPL is made to close.

Note that, as another embodiment, in the engine exhaust passage upstream of the exhaust purification catalyst 13, an oxidation catalyst for reforming the hydrocarbons can be arranged.

REFERENCE SIGNS LIST 4 intake manifold
5 exhaust manifold
7 exhaust turbocharger
12a, 12b exhaust pipe
13 exhaust purification catalyst
14 particulate filter
15 hydrocarbon feed valve
HPL high pressure exhaust gas recirculation system
LPL low pressure exhaust gas recirculation system

The invention claimed is:
1. An exhaust purification system of an internal combustion engine, comprising:
  a hydrocarbon feed valve arranged in an engine exhaust passage;
  an exhaust purification catalyst and a particulate filter arranged downstream of the hydrocarbon feed valve in the engine exhaust passage;
  a precious metal catalyst carried on an exhaust gas flow surface of the exhaust purification catalyst;
  a basic exhaust gas flow surface part formed around the precious metal catalyst; and
  an electronic control unit configured to control the hydrocarbon feed valve such that a concentration of hydrocarbons flowing into the exhaust purification catalyst vibrates within a predetermined range of amplitude and within a predetermined range of period,
  wherein the exhaust purification catalyst has a property of reducing $NO_X$ contained in an exhaust gas, when the electronic control unit controls the hydrocarbon feed valve such that the concentration of hydrocarbons flowing into the exhaust purification catalyst vibrates within the predetermined range of amplitude and within the predetermined range of period, and wherein the exhaust purification catalyst has a property of increasing an amount of $NO_X$ contained in the exhaust gas when the electronic control unit causes the concentration of hydrocarbons to vibrate for a period longer than the predetermined range of period, wherein the electronic control unit is further configured to control the hydrocarbon feed valve to inject the hydrocarbons within the predetermined range of period at the time of engine operation to thereby remove $NO_X$ contained in the exhaust gas, wherein the exhaust purification system comprises a low pressure exhaust gas recirculation system that makes the exhaust gas in the engine exhaust passage downstream of the exhaust purification catalyst and the particulate filter recirculate to an inside of an intake passage, wherein when the electronic control unit controls the hydrocarbon feed valve to inject the hydrocarbons while an exhaust gas recirculation action is performed by the low pressure exhaust gas recirculation system, carbon dioxide produced in the exhaust purification catalyst is recirculated, and after the injection of the hydrocarbons, each time when a time required for recirculation of the carbon dioxide elapses, a temporary drop is repeatedly caused in an air-fuel ratio of an inflowing exhaust gas that flows into the exhaust purification catalyst and the particulate filter, wherein the electronic control unit is further configured to allow an injection of the hydrocarbons from the hydrocarbon feed valve that is synchronized with the temporary drop in air-fuel ratio of the inflowing exhaust gas, when the hydrocarbons are injected from the hydrocarbon feed valve within the predetermined range of period for removing $NO_x$ contained in the exhaust gas, and wherein the electronic control unit is further configured to control the hydrocarbon feed valve to inject the hydrocarbons so as not to overlap with the temporary drop in the air-fuel ratio of the inflowing exhaust gas when the hydrocarbons are periodically injected from the hydrocarbon feed valve for temperature elevation control of at least one of the particulate filter and the exhaust purification catalyst.

2. The exhaust purification system of an internal combustion engine as claimed in claim 1, wherein when the electronic control unit controls the hydrocarbon feed valve to periodically inject the hydrocarbons for temperature elevation control of at least one of the particulate filter and the exhaust purification catalyst, after a first injection of the hydrocarbons, a second injection of the hydrocarbons from the hydrocarbon feed valve is performed in an interval between two temporary drops in the air-fuel ratio of the inflowing exhaust gas that are caused after the first injection of the hydrocarbons.

3. The exhaust purification system of an internal combustion engine as claimed in claim 2, wherein when the electronic control unit controls the hydrocarbon feed valve to periodically inject the hydrocarbons for temperature elevation control of at least one of the particulate filter and the exhaust purification catalyst, an injection timing of the hydrocarbons, at which the second injection of the hydrocarbons from the hydrocarbon feed valve is performed after the first injection of the hydrocarbons, is calculated from a recirculation rate of the exhaust gas and an intake air amount.

4. The exhaust purification system of an internal combustion engine as claimed in claim 2, wherein when the electronic control unit controls the hydrocarbon feed valve to periodically inject the hydrocarbons for temperature elevation control of at least one of the particulate filter and the exhaust purification catalyst, after the first injection of hydrocarbons, the second injection action of the hydrocarbons from the hydrocarbon feed valve is performed after the temporary drop in the air-fuel ratio of the inflowing exhaust gas is first caused due to the first injection of the hydrocarbons.

5. The exhaust purification system of an internal combustion engine as claimed in claim 1, wherein the electronic control unit controls the hydrocarbon feed valve to inject the hydrocarbons for the temperature elevation control of the particulate filter to regenerate the particulate filter.

6. The exhaust purification system of an internal combustion engine as claimed in claim 1, wherein the electronic control unit controls the hydrocarbon feed valve to inject the hydrocarbons for the temperature elevation control of the exhaust purification catalyst to release $SO_x$ from the exhaust purification catalyst.

7. The exhaust purification system of an internal combustion engine as claimed in claim 6, wherein when $SO_x$ should be released from the exhaust purification catalyst, the electronic control unit is further configured to control the hydrocarbon feed valve to alternately perform rich control for making the air-fuel ratio of the inflowing exhaust gas into the exhaust purification catalyst temporarily rich and temperature elevation control for releasing $SO_x$ from the exhaust purification catalyst, and wherein when the rich control is being performed, the exhaust gas recirculation action by the low pressure exhaust gas recirculation system is suspended.

8. The exhaust purification system of an internal combustion engine as claimed in claim 1, further comprising:
a cooling device arranged in an exhaust gas recirculation passage of the low pressure exhaust gas recirculation system for cooling the exhaust gas flowing within the exhaust gas recirculation passage;
a bypass passage that bypasses the cooling device and that is connected to the exhaust gas recirculation passage;
a flow path switching valve configured for selectively feeding exhaust gas to the inside of the cooling device or the inside of the bypass passage, wherein the flow path switching valve is provided so that exhaust gas is normally fed into the cooling system, and the flow path switching valve is switched so that the exhaust gas does not flow into the cooling device, but flows into the bypass passage when the exhaust gas recirculation action by the low pressure exhaust gas recirculation system is performed and when an amount of hydrocarbons flowing into the exhaust gas recirculation passage exceeds a predetermined allowable amount.

9. The exhaust purification system of an internal combustion engine as claimed in claim 8, wherein the flow path switching valve is switched so that the exhaust gas does not flow into the cooling device, but flows into the bypass passage when hydrocarbons are injected from the hydrocarbon feed valve within said predetermined period so as to remove $NO_x$ contained in the exhaust gas and an amount of hydrocarbons flowing into the exhaust gas recirculation passage exceeds the predetermined allowable amount.

* * * * *